United States Patent
Watanabe

(10) Patent No.: US 10,632,381 B2
(45) Date of Patent: Apr. 28, 2020

(54) CONTROL PROGRAM, CONTROL METHOD, AND COMPUTER

(71) Applicant: GREE, Inc., Tokyo (JP)

(72) Inventor: Ken Watanabe, Tokyo (JP)

(73) Assignee: GREE, Inc., Tokyo (JP)

(*) Notice: Subject to any disclaimer, the term of this patent is extended or adjusted under 35 U.S.C. 154(b) by 0 days.

(21) Appl. No.: 15/606,108

(22) Filed: May 26, 2017

(65) Prior Publication Data

US 2018/0001195 A1    Jan. 4, 2018

(30) Foreign Application Priority Data

Jun. 30, 2016   (JP) ................... 2016-131086

(51) Int. Cl.
*A63F 13/45* (2014.01)
*A63F 13/55* (2014.01)
*A63F 13/795* (2014.01)

(52) U.S. Cl.
CPC .............. *A63F 13/45* (2014.09); *A63F 13/55* (2014.09); *A63F 13/795* (2014.09)

(58) Field of Classification Search
CPC ......... A63F 13/45; A63F 13/55; A63F 13/795
See application file for complete search history.

(56) References Cited

U.S. PATENT DOCUMENTS

| | | | | |
|---|---|---|---|---|
| 2006/0184260 A1* | 8/2006 | Graepel | ................. | G06Q 10/00 700/92 |
| 2015/0238864 A1* | 8/2015 | Taoka | ..................... | A63F 13/67 463/23 |
| 2015/0367240 A1* | 12/2015 | Otomo | .................. | A63F 13/847 463/7 |

FOREIGN PATENT DOCUMENTS

JP       2014-133151 A       7/2014

OTHER PUBLICATIONS

Infinity Blade, released Dec. 9, 2010, evidence by Infinity Blade—Wikipedia06102015version.pdf, https://en.wikipedia.org/w/index.php?title=Infinity_Blade&oldid=666342382.*
Infinity Blade, released Dec. 9, 2010, evidence by Infinity Blade—Wikipedia06102015version.pdf, https://en.wikipedia.org/w/index.php?title=Infinity Blade&oldid=666342382 (Year: 2010).*
Domination—Official TF2 Wiki_Official Team Fortress Wiki_04222015.pdf, https://wiki.teamfortress.com/w/index.php?title=Domination&oldid=1898534, published on Apr. 22, 2015 (Year: 2015).*

(Continued)

*Primary Examiner* — William H McCulloch, Jr.
*Assistant Examiner* — Yingchuan Zhang
(74) *Attorney, Agent, or Firm* — Maier & Maier, PLLC

(57) ABSTRACT

Disclosed is a control program for a computer, the computer including a storage unit and being configured to execute a competition game. The storage unit stores a competition result and a counter for each combination of at least two competing players. The control program causes the computer to execute a competition between at least two players When a winning player, of at least two competing players, was defeated by a losing player in an immediately preceding competition, the computer increases the counter corresponding to the combination of the at least two competing players, determines points to be awarded based on the counter, and stores the determined points in the storage unit in association with the winning player.

11 Claims, 9 Drawing Sheets

(56) References Cited

OTHER PUBLICATIONS

Team Fortress 2—Wikipedia_11092015.pdf, https://en.wikipedia.org/w/index.php?title=Team_Fortress_2&oldid=689776173, published on Nov. 9, 2015 (Year: 2015).*

Scoreboard—Official TF2 Wiki_Official Team Fortress Wiki_12202015.pdf, https://wiki.teamfortress.com/w/index.php?title=Scoreboard&oldid=2018191, published on Dec. 20, 2015 (Year: 2015).*

* cited by examiner

FIG.6A

STATE — 600

- TOTAL POINT: 1000
- RANKING: 100
- WIN COUNT: 100
- LOSS COUNT: 10
- REVENGE COUNT: 5
- ALTERNATE REVENGE COUNT: 2
- CHAIN COUNT: 10

- ITEM ATTACK POWER: 100
- ITEM DEFENSE POWER: 100

- EVENT REMAINING TIME: 48 HOURS (601)

FIG.6B

RECORD — 610

611  612  613  614

1ST   PLAYER B   200P   

2ND   PLAYER F   150P   

3RD   PLAYER C   100P   

HISTORY — 620

9 HOURS AGO
   PLAYER B DEFEAT PLAYER A  (621)

5 HOURS AGO
   PLAYER E DEFEAT PLAYER A

1 HOUR AGO
   PLAYER A TAKE REVENGE ON PLAYER B

1 HOUR AGO
PLAYER H TAKE ALTERNATE REVENGE
    ON PLAYER E

UPDATE INFORMATION — 630

13 P WIN!  (631)

(632)

5 HOURS AGO
   DEFEATED BY PLAYER E
   -2P

5 HOURS AGO
   DEFEAT PLAYER I
   +5P

1 HOUR AGO
PLAYER H TAKE ALTERNATE
   REVENGE ON PLAYER E
+10P

FIG.8A

| PLAYER ID | PASSWORD | NAME | AVATAR IMAGE | OWNING ITEM ID | USABLE ITEM INFORMATION (ITEM ID, ATTACK POWER, DEFENSE POWER) | TOTAL POINT | GROUP ID |
|---|---|---|---|---|---|---|---|
| P_001 | xxxx | PLAYER A | IMAGE A | I_001,... | (I_001,100,100) | 1000 | G_001 |
| P_101 | xxxx | PLAYER B | IMAGE B | I_101,... | (I_101,200,200) | 2000 | — |
| ⋮ | ⋮ | ⋮ | ⋮ | ⋮ | ⋮ | ⋮ | ⋮ |

FIG.8B

| FIRST PLAYER ID | SECOND PLAYER ID | COMPETITION RESULT (DATE AND TIME, ATTACKER, WIN/LOSS, ...) | CHAIN COUNT | FIRST PLAYER CORRECTION VALUE | SECOND PLAYER CORRECTION VALUE |
|---|---|---|---|---|---|
| P_001 | P_101 | (2016/5/1 12:00:00,P_001,WIN,...), (2016/5/1 13:00:00,P_101,WIN,...), | 10 | 0 | 0 |
| P_001 | P_102 | (2016/5/1 12:01:00,P_001,WIN,...), (2016/5/1 14:00:00,P_102,LOSS,...) | 10 | 0 | 10 |
| ⋮ | ⋮ | ⋮ | ⋮ | ⋮ | ⋮ |

FIG.8C

| GROUP ID | BELONGING PLAYER ID |
|---|---|
| G_001 | P_001, P_002, |
| G_002 | P_101, P_102, |
| ⋮ | ⋮ |

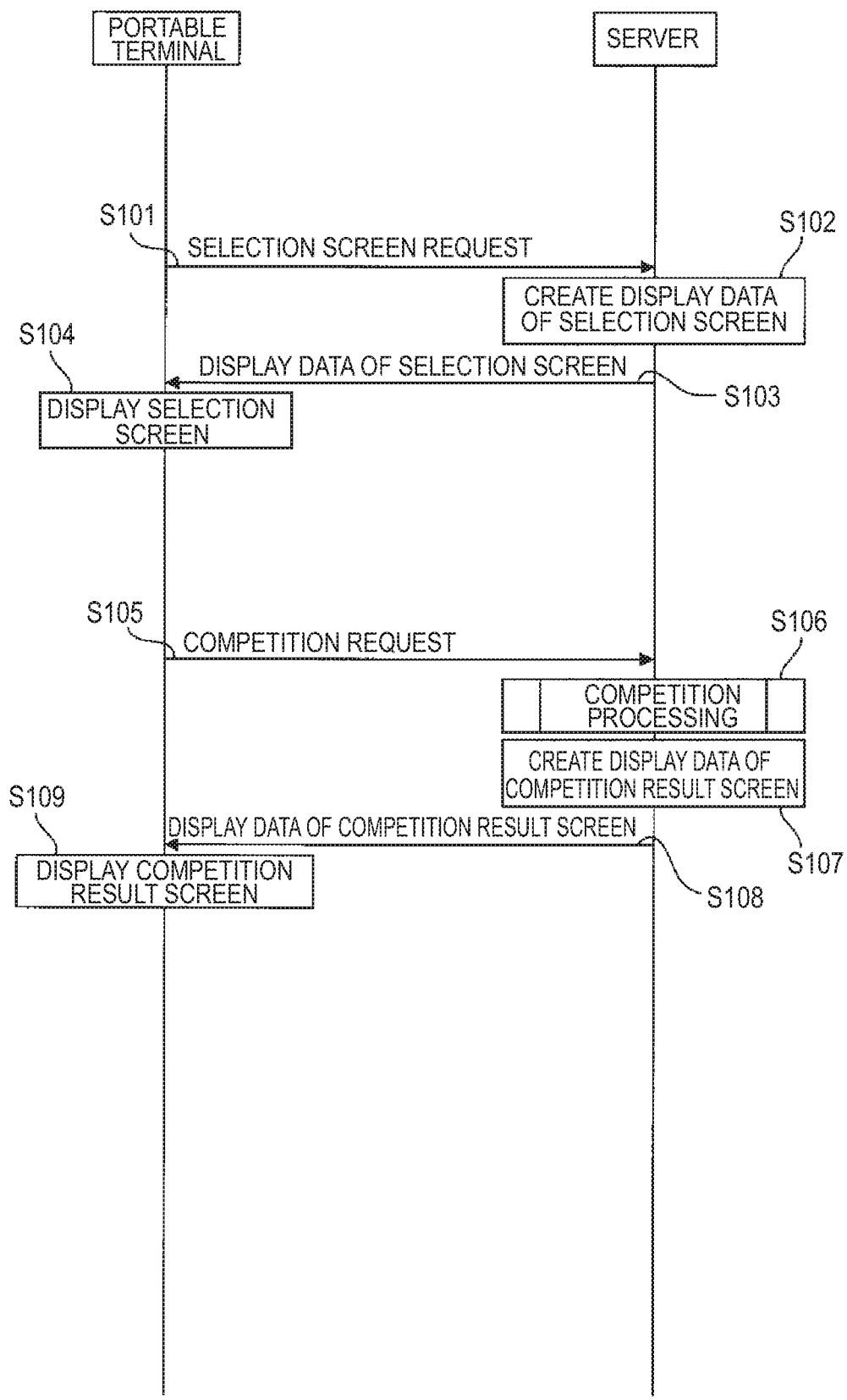

CONTROL PROGRAM, CONTROL METHOD, AND COMPUTER

BACKGROUND OF THE INVENTION

Field of the Invention

The present invention relates to a control program, a control method, and a computer.

Background Art

In recent years, servers which provide a game to portable terminals through a communication network have become increasingly widespread. The servers may provide a game (a so-called "social game") in which a plurality of players can participate. "Social games" may include, for example, a competition game in which players compete with each other.

JP-A-2014-133151 discloses a game control device which executes a competition game including competition elements between the players. In this competition game, an ability value of a player character is updated automatically based on a competition result or according to a player's operation on a communication terminal.

SUMMARY OF THE INVENTION

In the competition game described above, since the ability value of the player character is updated based on the competition result, it is possible to attract the player to the competition game. However, in such a competition game, a determination method of the updated ability value may become monotonous, and there is a possibility that the player loses a desire to continue the game.

In order to solve such a problem, a control method, a computer, and a control program capable of maintaining and improving players' desires to perform a game in a competition game in which players compete with each other may be provided.

According to an exemplary embodiment, there may be provided a control program for a computer which includes a storage unit and executes a competition game. The storage unit may store a competition result and a counter for each combination of at least two competing players. The control program may cause the computer to execute steps of executing a competition between at least two players; in a case where a winning player of at least two competing players is defeated by a losing player in an immediately preceding competition, increasing the counter regarding the combination of at least two competing players; and determining points based on the counter and storing the determined points in the storage unit in association with the winning player.

The computer may be a computer configured to execute the above-described procedure, and may be, for example, a portable terminal, a fixed terminal, a server, or the like.

In the control program according to the invention, the computer may further include an output unit, and before the executing of the competition, display data for displaying, on a terminal of each player, a game screen on which a player who has defeated each player in the immediately preceding competition may be displayed to be competable (i.e. may be displayed to be a player that can be competed with) and a player who has been defeated by each player in the immediately preceding competition may not be displayed to be competable, may be output to the output unit.

According to an exemplary embodiment, in the control program, in the executing of the competition, a parameter regarding the competition of each player may be calculated based on the points given to each player.

According to an exemplary embodiment, in the control program, second points may be stored in the storage unit in association with either the winning player or the losing player of at least two competing players, and in the executing of the competition, the parameter regarding the competition of each player may be corrected based on the second points associated with each player.

According to an exemplary embodiment, in the control program, the parameter regarding the competition of each player may be calculated based on a parameter of a game content used by each player in the competition, usability conditions may be set in the game content, and in a case where predetermined conditions are satisfied, the usability conditions of the game content may be set different.

According to an exemplary embodiment, in the control program, in a case where the parameter regarding the competition of each player becomes equal to or greater than a predetermined value, means for reducing the parameter may be provided to each player.

According to an exemplary embodiment, in the control program, the storage unit may further store a relevant player related to each player, and in the increasing of the counter, in a case where a relevant player related to the winning player of at least two competing players is defeated by the losing player in the immediately preceding competition, the counter regarding a combination of the relevant player and the losing player may be increased.

According to an exemplary embodiment, in the control program, in the determining of the points, the points may be corrected based on an elapsed time after the winning player has been defeated by the losing player in the immediately preceding competition or the number of combinations regarding the winning player where the counter is equal to or greater than a predetermined value.

According to an exemplary embodiment, in the control program, in a case where a predetermined time has elapsed from the immediately preceding competition of at least two competing players, the counter regarding the combination of at least two competing players may be initialized.

According to another exemplary embodiment, there may be provided a control method for a computer which includes a storage unit and executes a competition game. The storage unit may store a competition result and a counter for each combination of at least two competing players. The control method may include executing a competition between at least two players; in a case where a winning player of at least two competing players is defeated by a losing player in an immediately preceding competition, increasing the counter regarding the combination of at least two competing players; and determining points based on the counter and giving the determined points by storing the determined points in the storage unit in association with the winning player.

According to a further exemplary embodiment, there may be provided a computer which executes a competition game. The computer may include a storage unit which stores a competition result and a counter for each combination of at least two competing players; a competition execution unit which executes a competition between at least two players, and in a case where a winning player of at least two competing players is defeated by a losing player in an immediately preceding competition, increases the counter regarding the combination of at least two competing players; and an association unit which determines points based on the counter and stores the determined points in the storage unit in association with the winning player.

According to the control method, the computer, and the control program of the invention, in a competition game in which players compete with each other, points given to a winning player may be changed according to the number of wins after each player defeats an opponent player. With this, it is possible to improve strategy for obtaining points in a competition game, and to maintain and improve player's desires to perform a game.

BRIEF DESCRIPTION OF THE DRAWINGS

FIGS. 6A to 6D are diagrams showing an example of the display screen of the portable terminal.

FIG. 8A is a diagram showing an example of a player table, FIG. 8B is a diagram showing an example of a competition information table, and FIG. 8C is a diagram showing an example of a group table.

FIG. 9 is a diagram showing an example of an operation sequence of the game system.

DETAILED DESCRIPTION OF THE INVENTION

Figure 1:
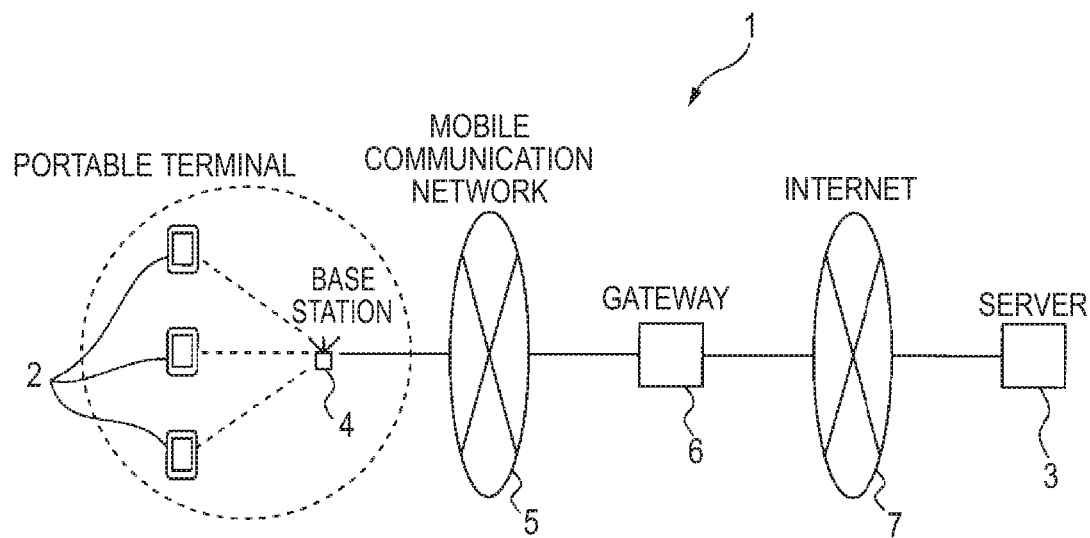
FIG. 1 is a diagram showing an example of the schematic configuration of a game system.

Hereinafter, various exemplary embodiments may be described referring to the drawings. However, it should be noted that the technical scope of the invention is not limited to these embodiments and covers other exemplary embodiments described in the appended claims and equivalents thereof.

1. Outline of this Embodiment

In a game system of this embodiment, players may perform a game provided by a server using portable terminals. The server may allow each player to equip each character with a weapon and executes a competition game in which the respective characters compete with one another.

The character and the weapon equipped by the character are examples of a game content which may be used by each player in the competition. The game content may be electronic data which is used in the game, and includes, for example, a card, an item, a character, an avatar, or the like. Although the game content may be electronic data which may be retrieve, possessed, used, managed, exchanged, combined, augmented, sold, discarded, and/or gifted in the game by the player according to the progress of the game, the forms of use of the game content are not limited to those explicitly included in the disclosure.

Each weapon equipped by the character may have parameters which are used in the competition. The parameters which may be used in the competition may be, for example, attack power, defense power, stamina (or hit points (HP)), an attribute (for example, first, water, thunder, or the like), a degree of rarity (for example, normal, rare, super (S) rare, double-super (SS) rare, triple-super (SSS) rare, legend, or the like), an activation rate of a skill (special effect), attack speed (the number of attack per turn, the number of turns until attack, or the like), the number of defense per competition, and the like.

In this competition game, win/loss may be determined based on a predetermined competition logic. For example, in this competition game, win/loss may be determined based on parameters regarding the competition of each character. The parameters regarding the competition of each character may be calculated from one or a plurality of parameters of each character itself, the parameters of one or a plurality of weapons equipped by each character, a combination of each parameter of each character itself and each parameter of the weapon equipped by the character, or the like. The parameter of each character or each weapon (item) means the parameter associated with each character or each weapon. In the following description, a competition game in which the parameters regarding the competition of each player are calculated based on the parameter of the weapon equipped by each character and win/loss is determined based on the calculated parameters will be described as an example.

In an exemplary embodiment, specific points may be given to a winning player. The parameters of each weapon may be augmented by the given points. That is, the player can augment the weapon when defeating other players, and the more the player defeats other players, the stronger the player becomes. In this competition game, the points which are given to the winning player may be determined by the number of wins after each player has been defeated by an opponent player. In order to increase the given points, each player may need to alternately compete with other players such that win/loss is different. Each player develops through friendly rivalry in order to defeat a player who has defeated the player, and the competition game is activated. With this, in the competition game, it is possible to improve strategy for obtaining points, and to maintain and improve players' desires to perform the game.

2. Configuration of Game System 1

FIG. 1 is a diagram showing an example of the schematic configuration of a game system 1.

The game system 1 may include at least one portable terminal 2 and a server 3. The portable terminal 2 and the server 3 may be connected to each other through, for example, a communication network, such as a base station 4, a mobile communication network 5, a gateway 6, and the Internet 7. A program (for example, a browsing program) which is executed on the portable terminal 2 and a program (for example, a game program) which is executed on the server 3 may perform communication using a communication protocol, such as a Hypertext Transfer Protocol (HTTP).

While a multi-function mobile phone (so-called smartphone) is supposed as the portable terminal 2, the invention is not limited thereto. The portable terminal 2 may be any device as long as the invention is applicable, and may be, for example, a mobile phone (so-called "feature phone"), a personal digital assistant (PDA), a portable game machine, a portable music player, a tablet terminal, a tablet PC, a notebook PC, or the like.

2.1. Configuration of Portable Terminal 2

Figure 2:
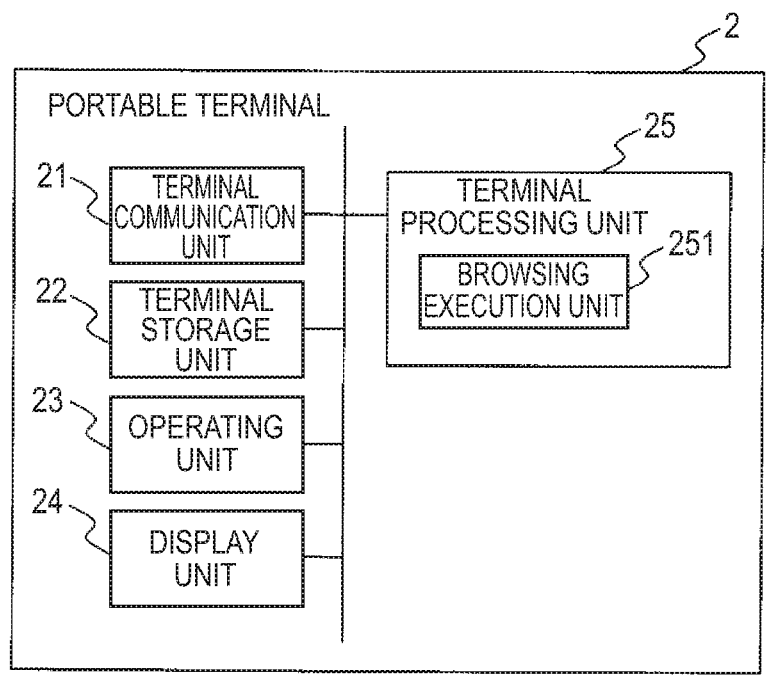
FIG. 2 is a diagram showing an example of the schematic configuration of a portable terminal.

FIG. 2 is a diagram showing an example of the schematic configuration of the portable terminal 2.

The portable terminal 2 may include a terminal communication unit 21, a terminal storage unit 22, an operating unit 23, a display unit 24, and a terminal processing unit 25. The portable terminal 2 may request the server 3 for the progress of the game according to a player's operation on the operating unit 23 (button or the like). The portable terminal 2 may receive display data regarding the progress of the game from the server 3 and may display display data.

The terminal communication unit 21 may include a communication interface circuit with an antenna having a predetermined frequency bandwidth as a reception bandwidth, and may connect the portable terminal 2 to a wireless communication network. The terminal communication unit 21 may establish a wireless signal link based on a code division multiple access (CDMA) system or the like with the base station 4 through a channel assigned by the base station 4, and may perform communication with the base station 4. The terminal communication unit 21 may transmit data supplied from the terminal processing unit 25 to the server 3 or the like. The terminal communication unit 21 may supply data received from the server 3 or the like to the terminal processing unit 25. The terminal communication unit 21 may perform wireless communication based on a wireless communication system of the IEEE 802.11 standard with an access point of wireless fidelity (Wifi) not shown).

The terminal storage unit 22 may include, for example, a semiconductor memory device. The terminal storage unit 22 may store an operating system program, driver programs, application programs, data, and the like to be used for processing in the terminal processing unit 25. For example, the terminal storage unit 22 may store, as the driver programs, an input device driver program for controlling the operating unit 23, an output device driver program for controlling the display unit 24, and the like. The terminal storage unit 22 may store, as the application programs, a program for acquiring and displaying display data regarding the progress of the game, and the like. The computer program may be installed on the terminal storage unit 22 from, for example, a computer-readable non-transitory recording medium, such as a compact disk read only memory (CD-ROM) or a digital versatile disk read only memory (DVD-ROM), using a known setup program or the like. The terminal storage unit 22 may store, as data, a player ID as identification information of the player of the portable terminal 2, display data regarding the progress of the game, video data, image, data, and the like. The terminal storage unit 22 may temporarily store temporary data regarding predetermined processing.

The operating unit 23 may be any device as long as the device is capable of operating the portable terminal 2, and is, for example, a touch panel, key buttons, or the like. The player can input text, numbers, symbols, or the like using the operating unit 23. If being operated by the player, the operating unit 23 may generate a signal corresponding to the operation. The generated signal may be supplied to the terminal processing unit 25 as an instruction from the player.

The display unit 24 may be any device as long as the device is capable of displaying video, images, and the like, and may be, for example, a liquid crystal display, an organic electro-luminescence (EL) display, or the like. The display unit 24 may display video according to video data supplied from the terminal processing unit 25, an image according to image data, and the like.

The terminal processing unit 25 may include one or a plurality of processors and peripherals thereof. The terminal processing unit 25 may be, for example, a central processing unit (CPU), and may integrally control the overall operation of the portable terminal 2. The terminal processing unit 25 may control the operations of the terminal communication unit 21, the display unit 24, and the like such that various kinds of processing of the portable terminal 2 are executed in an appropriate procedure based on the programs stored in the terminal storage unit 22, operations on the operating unit 23, and the like. The terminal processing unit 25 may execute processing based on the programs (operating system program, driver programs, application programs, and the like) stored in the terminal storage unit 22. The terminal processing unit 25 can execute a plurality of programs (application programs and the like) in parallel.

2.1.1. Function of Terminal Processing Unit 25

Figure 3:
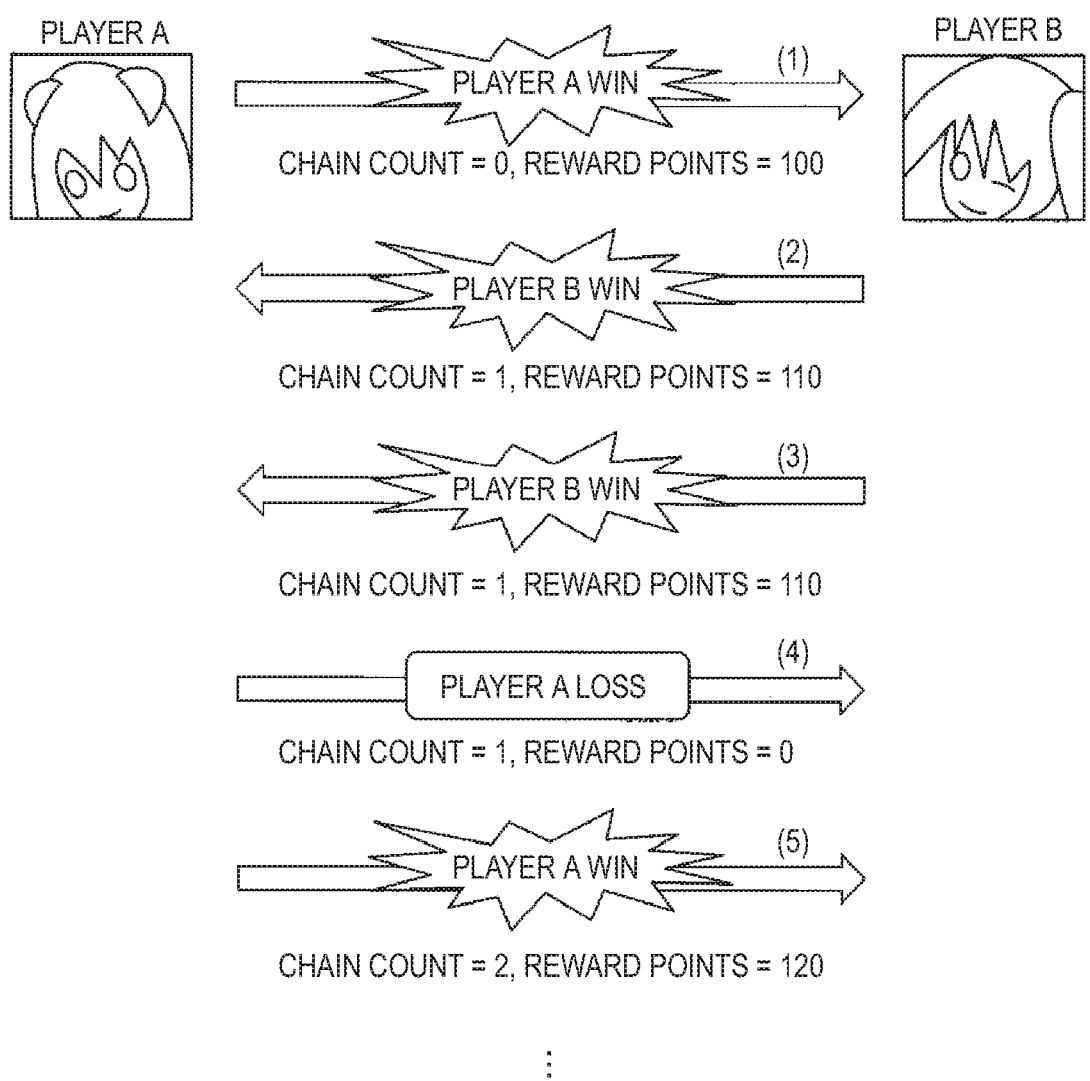
FIG. 3 is a schematic view illustrating a competition game.

FIG. 3 is a schematic view illustrating the competition game provided by the game system 1.

According to an exemplary embodiment of a competition game, a competition event may be held in each predetermined period, and a weapon may be given to each player when the competition event starts. Each player may equip each character owned by the player with the weapon and may cause the character to compete with a character owned by another player. In this competition game, a competition between players may be executed when one player attacks the player. The competition is not limited to being executed when one player attacks another player, and may be executed when either player or both players select an action of "competition execution". In a case where a competition is executed when both players select an action of "competition execution", both players may attack each other in the competition. A competition result may be determined based on the attack power and the defense power of the weapon equipped by the character of each player. Points may be given to a player who wins the competition, and the attack power and the defense power of each weapon may be augmented by the points given to each player when the player wins. In the following description, the points given to the player who wins the competition are referred to as reward points.

In this competition game, the reward points given to each player may change according to the number of wins after one player of the two competing players has been defeated by another player. In the following description, the execution of attack by one player of the two competing players for the purpose of winning after having been defeated by another player is referred to as revenge, and the number of times in which each competing player succeeds in performing revenge is referred to as a chain count. The chain count is an example of a counter. According to an exemplary embodiment of a competition game, at the time the competition event ends, the weapon with the augmented attack power and defense power may be given to each player.

In an exemplary embodiment of a competition game, in a case where an executor of a competition is different from an executor of an immediately preceding competition and win/loss of the competition is different from win/loss of the immediately preceding competition, the chain count may increase (for example, +1). For example, in a case where one player is attacked and defeated by another player and then one player attacks and defeats another player, the chain count may increase. Even in a case where one player attacks and is defeated by another player and then one player is attacked by and defeats another player, the chain count may increase.

Even in a case where the executor of the competition is the same as the executor of the immediately preceding competition, in a case where win/loss of the competition is different from win/loss of the immediately preceding competition, the chain count may be increased. In this case, even in a case where one player attacks and is defeated by another player and then one player attacks and defeats another player, or even in a case where one player is attacked and defeated by another player and then one player is further attacked by and defeats another player, the chain count may increase.

FIG. 3 shows an example where a player A and a player B compete with each other. In the exemplary embodiment of FIG. 3, an initial value of the chain count is [0], and in a case where the player A attacks and defeats the player B for the first time, reward points [100] are given to the winning player A (1). Next, in a case where the player B attacks and defeats the player A, the chain count becomes [1], and points [110] which are greater than the reward points given to the player A for the first time are given to the winning player B (2). In this state, in a case where the player B further attacks and defeats the player A, the chain count remains [1], and the same reward points [110] as the immediately preceding reward points given to the player B are given to the winning player B (3).

In this state, in a case where the player A attacks and is defeated by the player B, the chain count remains [1], and no reward points are given to the losing player A (4). In a case where the player A attacks and defeats the player B, the chain count becomes [2], and reward points [120] which are greater than the immediately preceding reward points given to the player B are given to the winning player A (5).

In this way, in this competition game, the reward points given to each player may change according to the chain count between the player and an opponent player. In order to increase the chain count, each player may positively attack other players while planning a strategy to compete with a player having the same level of strength as the player, a player who frequently competes with the player, or the like. Therefore, in the competition game, it is possible to improve a strategy for a player to obtain reward points, and to maintain and improve players' desires to perform the game.

Figure 4A:
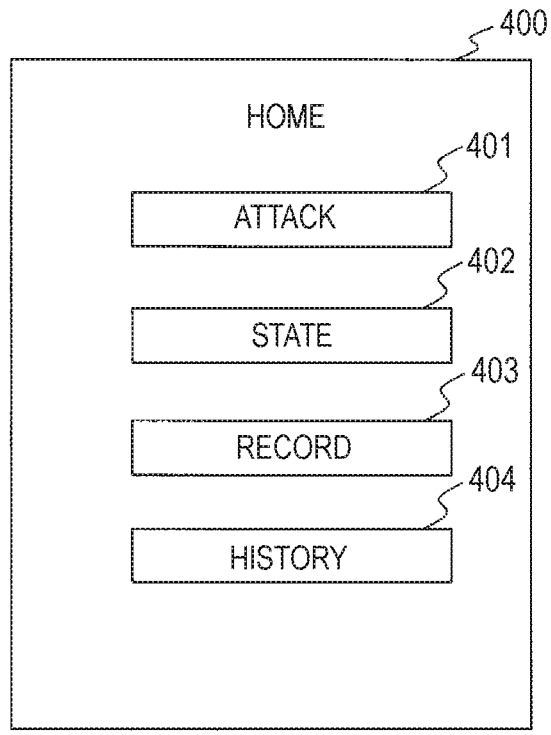
FIGS. 4A to 4D are diagrams showing an example of a display screen of the portable terminal.

FIG. 4A is a diagram showing an example of a home screen which may be displayed on the display unit 24.

A home screen 400 shown in FIG. 4A may be displayed at the time of the start of the game, or the like. Each screen described below may be displayed based on display data received from the server 3. In the following description, the player of the portable terminal 2, on which each screen is displayed, is referred to an execution player.

On the home screen 400, an attack button 401, a state button 402, a record button 403, a history button 404, and the like may be displayed.

In an exemplary embodiment, if the attack button 401 is pressed, an attack selection screen for selecting the type of attack may be displayed. If the state button 402 is pressed, a state screen for displaying the state of the execution player may be displayed. If the record button 403 is pressed, a record screen for listing and displaying the record of each player participating in the game may be displayed. If the history button 404 is pressed, a history screen for displaying the competition history of the execution player may be displayed.

Figure 4B:
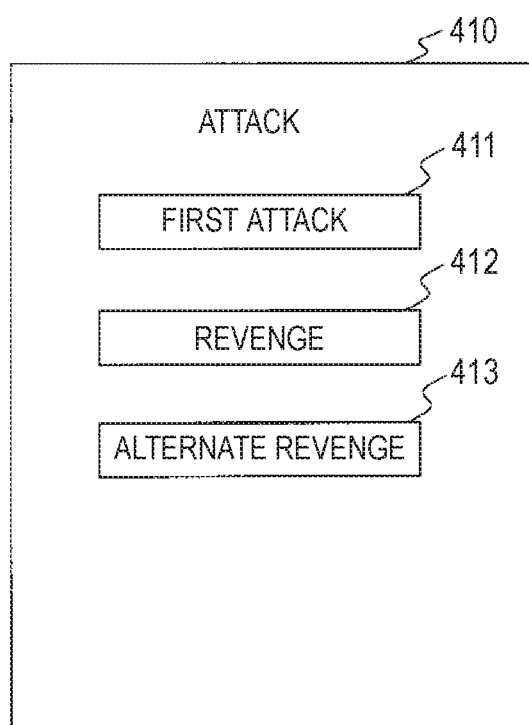

FIG. 4B is a diagram showing an example of the attack selection screen which is displayed on the display unit 24.

In an exemplary embodiment, an attack selection screen 410 shown in FIG. 4B may be displayed when the attack button 401 is pressed on the home screen 400. On the attack selection screen 410, a first attack button 411, a revenge button 412, an alternate revenge button 413, and the like may be displayed. In the following description, an attack of the execution player on a player who has not yet attacked and defeated other players is referred to as a first attack. An attack of the execution player on a player who has not yet attacked or a player who has not yet been attacked or an attack of the execution player on a player who has not yet been attacked and defeated may be included as a first attack. In the following description, a player who becomes a target of a first attack is referred to as a first attack-target player. That is, the first attack-target player may be a player whose chain count with the execution player is the initial value (0).

In this game, each player is classified into a group, and can take revenge on a player who has defeated another player in the same group, in place of that other player belonging to the same group. In the following description, taking, in place of the player belonging to the same group, revenge on the player who has defeated that other player is referred to alternate revenge, a player who takes alternate revenge is referred to as an alternate player, and a player who has the alternate player take alternate revenge on their behalf and belongs to the same group as the alternate player is referred to as an alternated player. An alternated player who belongs to a group, to which a player belongs, is an example of a relevant player related to a player. An alternated player may not be limited to a player who belongs to a group, to which a player belongs, and may be another player having a friend relationship with a player, a player who has relieved a player in a past battle, a player who has made a competition in the past, and/or a player who belongs to a group having made a competition in the past.

If the first attack button 411 is pressed, a first attack selection screen for selecting the first attack-target player may be displayed. If the revenge button 412 is pressed, a revenge selection screen for selecting a player to be a target of revenge may be displayed. If the alternate revenge button 413 is pressed, an alternate revenge selection screen for selecting a player to be a target of alternate revenge may be displayed.

Figure 4C:
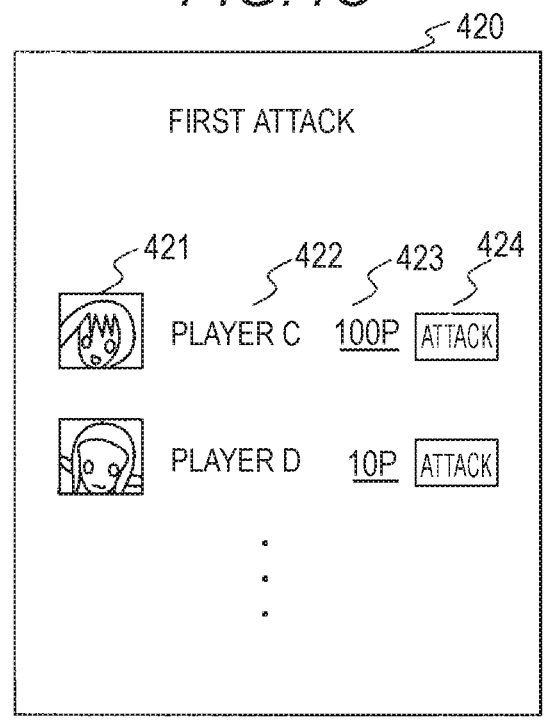

FIG. 4C is a diagram showing an example of the first attack selection screen which is displayed on the display unit 24.

In an exemplary embodiment, a first attack selection screen 420 shown in FIG. 4C may be displayed when the first attack button 411 is pressed on the attack selection screen 410. On the first attack selection screen 420, an avatar image 421 of each player, a name (player name) 422, total points 423, an attack button 424, and the like may be displayed for each first attack-target player. On the first attack selection screen 420, an item, such as a weapon to be used by each player, a parameter of the item, and the like may be further displayed for each first attack-target player.

The total points 423 may indicate the total of the reward points given to each player until the present, and are displayed to enable distinction between a case where the total points are greater than the total points of the execution player and a case where the total points are smaller than the total points of the execution player (for example, in a case where the total points are greater than the total points of the execution player, underline display, bold character display, or red display). The attack button 424 may be displayed to select a player to be a target of first attack. If the attack button 424 is pressed, an attack may be made on a player corresponding to the pressed attack button 424, and a result screen for displaying the result may be displayed.

In an exemplary embodiment, the first attack-target player may be automatically selected from among the players to be a target of first attack by the server 3. The server 3 may select, as the first attack-target player, a player in an order in which the record or level is close to the record or level of the execution player. For example, the server 3 may select, as the first attack-target player, a player in an order in which the total points are close to the total points of the execution player. The server 3 may select, as the first attack-target player, a player in an order in which the parameter (attack power or defense power) of the used weapon is close to the parameter of the weapon used by the execution player.

The server 3 may select all players satisfying conditions for a target of first attack as the first attack-target player and may display the selected players in an order in which the record or level is close to the record or level of the execution player.

Figure 4D:
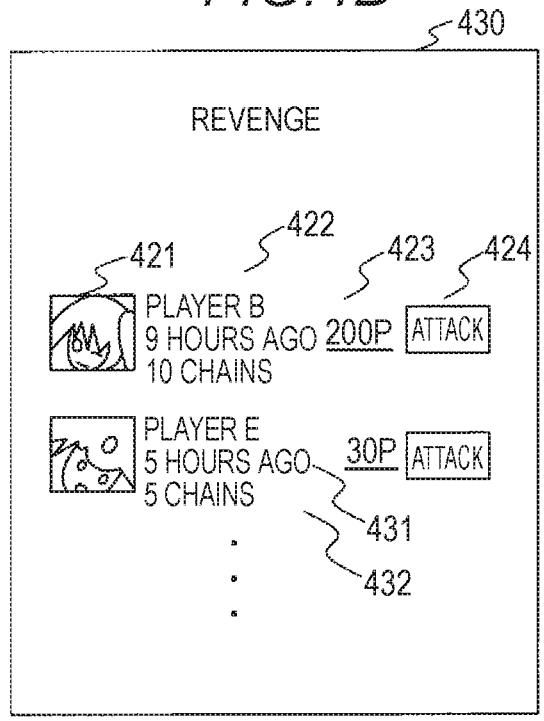

FIG. 4D is a diagram showing an example of the revenge selection screen which may be displayed on the display unit 24.

A revenge selection screen 430 shown in FIG. 4D may be displayed when the revenge button 412 is pressed on the attack selection screen 410. On the revenge selection screen 430, similarly to the first attack selection screen 420, an avatar image 421 of each player, a player name 422, the reward points 423, the attack button 424, and the like may be displayed, and in addition, a losing time 431, a chain count 432, and the like may be displayed for each player to be a target of revenge.

The losing time 431 may indicate the time (the relative time from the current time) when the execution player is attacked and defeated by each player. The chain count 432 may indicate the chain count between the execution player and each player. If the attack button 424 is pressed, an attack may be made on a player corresponding to the pressed attack button 424, and a result screen for displaying the result may be displayed.

In an exemplary embodiment, the server 3 may select, to be a target of revenge, a player who has attacked and defeated the execution player and then has not yet been attacked and defeated by the execution player.

Figure 5A:
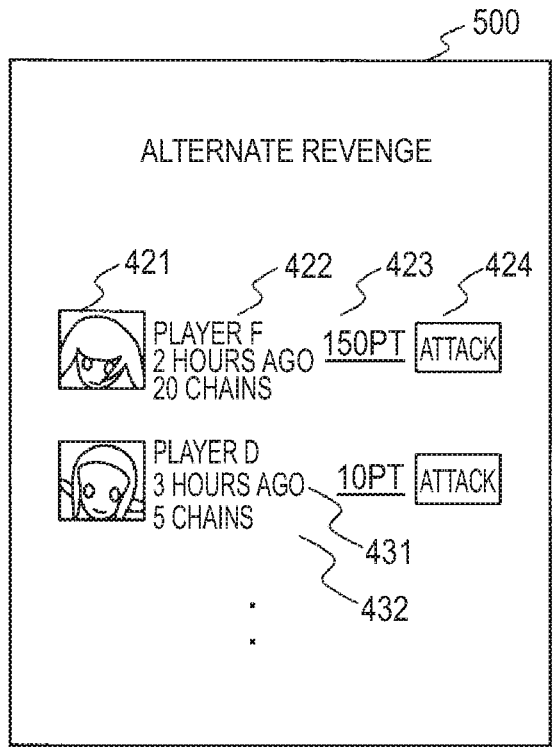
FIGS. 5A to 5D are diagrams showing an example of the display screen of the portable terminal.

FIG. 5A is a diagram showing an example of the alternate revenge selection screen which may be displayed on the display unit 24.

In an exemplary embodiment, an alternate revenge selection screen 500 shown in FIG. 5A may be displayed when the alternate revenge button 413 is pressed on the attack selection screen 410. On the alternate revenge selection screen 500, similarly to the revenge selection screen 430, an avatar image 421 of each player, a player name 422, reward points 423, an attack button 424, a losing time 431, a chain count 432, and the like may be displayed for each player to be a target of alternate revenge.

The losing time 431 may indicate the time (the relative time from the current time) when the alternated player is attacked and defeated by each player. The chain count 432 may indicate the chain count between the alternated player and each player. If the attack button 424 is pressed, an attack may be made against a player corresponding to the pressed attack button 424, and a result screen for displaying the result may be displayed.

In an exemplary embodiment, the server 3 may select, as a player to be a target of alternate revenge, a player who has attacked and defeated the alternated player and then has not yet been attacked and defeated by the execution player or the relevant player of the execution player.

The revenge selection screen 430 shown in FIG. 4D and the alternate revenge selection screen 500 shown in FIG. 5A may be displayed to select an opponent player who competes with the execution player before the execution of the competition. On the revenge selection screen 430 and the alternate revenge selection screen 500, a player who has defeated each player in the immediately preceding competition may be displayed to be competable, and a player who has been defeated by each player in the immediately preceding competition may not be displayed to be competable. That is, on the revenge selection screen 430 and the alternate revenge selection screen 500, since the players to be a target of revenge or alternate revenge are displayed in a list, it is possible to allow the execution player to easily select only players capable of increasing the chain count by winning, and it is possible to improve a player's convenience.

Figure 5B:
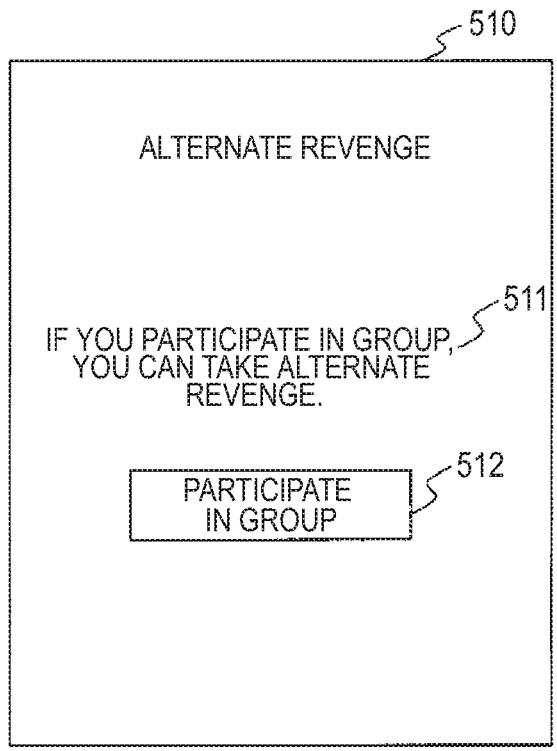

FIG. 5B is a diagram showing another example of the alternate revenge selection screen which may be displayed on the display unit 24.

In an exemplary embodiment, an alternate revenge selection screen 510 shown in FIG. 5B may be displayed in a case where the execution player does not belong to a group. On the alternate revenge selection screen 510, a merit 511 to be obtained in a case where a player belongs to a group, a button 512 for participating in a group, and the like may be displayed. If the button 512 is pressed, a group selection screen (not shown) for selecting a group in which the player participates may be displayed, and the player can participate in a specific group.

Figure 5C:
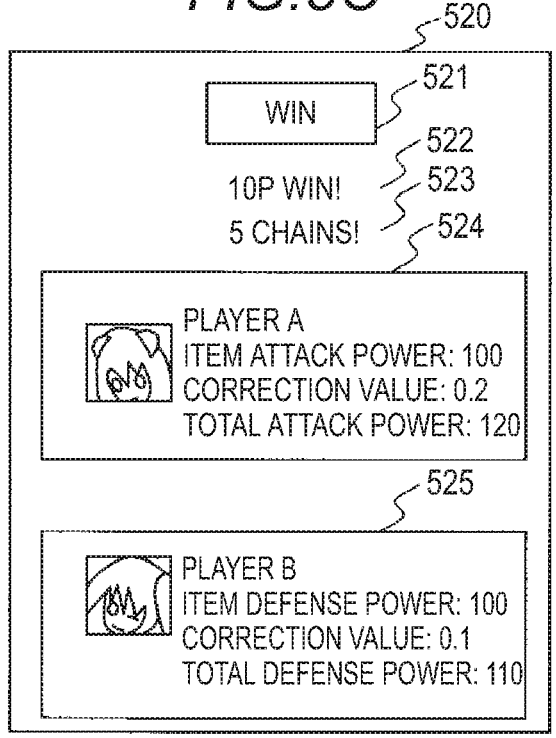

FIG. 5C is a diagram showing an example of the result screen which may be displayed on the display unit 24.

A result screen 520 shown in FIG. 5C may be displayed in a case where an attack is made by pressing the attack button 424 is pressed on the first attack selection screen 420, the revenge selection screen 430, or the alternate revenge selection screen 500 and the execution player wins. On the result screen 520, a competition result 521, reward points 522, a chain count 523, information 524 relating to the execution player, information 525 relating to a competing opponent player, and the like may be displayed.

On the result screen 520, the effect of winning the competition may be displayed as the competition result 521. The reward points 522 indicate the reward points given by the competition. The chain count 523 indicates the chain count after the competition between the execution player and the opponent player. Information 524 relating to the execution player includes a player name, item attack power, a correction value, and total attack power, and information 525 relating to the opponent player includes a player name, item defense power, a correction value, and total defense power.

The item attack power may indicate the attack power of an item (weapon) used by an offensive player, the correction value may indicate a correction value for correcting the item attack power, and the total attack power may indicate a value obtained by correcting the item attack power with the correction value. The item defense power may indicate defense power of an item used by a defensive player, the correction value may indicate a correction value for correcting the item defense power, and the total defense power may indicate a value obtained by correcting the item defense power with the correction value. In this competition game, the competition may be executed based on the total attack power of the offensive player and the total defense power of the defensive player. In an exemplary embodiment, in a case where the total attack power of the offensive player is equal to or greater than the total defense power of the defensive player, the offensive player wins, and in a case where the total attack power of the offensive player is less than the total defense power of the defensive player, the defensive player wins.

Figure 5D:
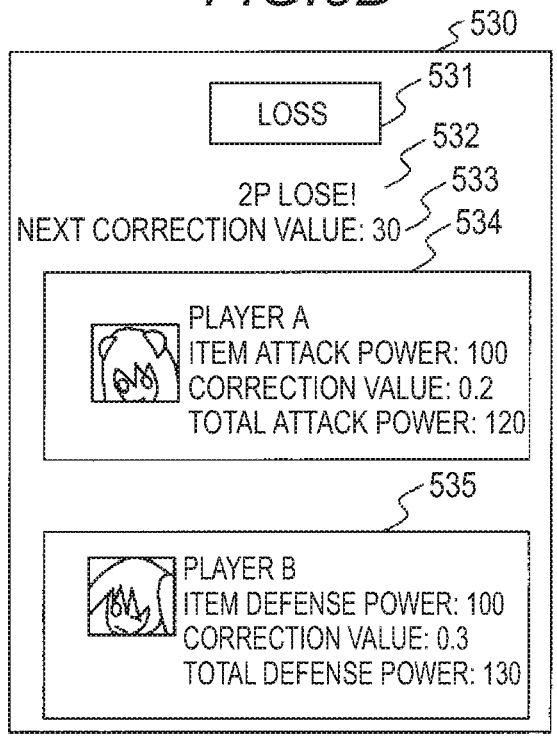

FIG. 5D is a diagram showing an example of the result screen which may be displayed on the display unit 24.

In an exemplary embodiment, a result screen 530 shown in FIG. 5D may be displayed in a case where an attack is made by pressing the attack button 424 on the first attack selection screen 420, the revenge selection screen 430, or the alternate revenge selection screen 500 and the execution player loses. On the result screen 530, similarly to the result screen 520, a competition result 531, reward points 532, a chain count 533, information 534 relating to the execution player, information 535 relating to the competing player, and the like may be displayed.

On the result screen 530, the effect of losing the competition may be displayed as the competition result 531, and a correction value of the execution player in the next competition may be displayed in place of the chain count. Other kinds of information may be the same as the information displayed on the result screen 520.

FIG. 6A is a diagram showing an example of the state screen which may be displayed on the display unit 24.

A state screen 600 shown in FIG. 6A may be displayed when the state button 402 is pressed on the home screen 400. On the state screen 600, a state 601 of the execution player, and the like may be displayed.

In the state 601, total points, ranking, a win count, a loss count, a revenge count, an alternate revenge count, a chain count, item attack power, item defense power, a remaining time, and the like may be displayed. The ranking may be the ranking of the execution player among all players determined by the total points. The win count and the loss count may be, respectively, the number of times in which the execution player defeats other players and the number of times in which the execution player is defeated by other players. The revenge count and the alternate revenge count may be, respectively, the number of times in which the execution player succeeds in revenge on other players and the number of times in which the execution player succeeds in alternate revenge on other players. The item attack power and the item defense power may be the current attack power and defense power of the item used by the execution player. The remaining time may be the remaining time of the competition event.

FIG. 6B is a diagram showing an example of the record screen which may be displayed on the display unit 24.

A record screen 610 shown in FIG. 6B may be displayed when the record button 403 is pressed on the home screen 400. On the record screen 610, the record of each player who participates in the competition event may be displayed in a list. On the record screen 610, ranking 611, a player name 612, total points 613, an avatar image 614, and the like may be displayed in a descending order of the total points of each player.

FIG. 6C is a diagram showing an example of the history screen which may be displayed on the display unit 24.

In an exemplary embodiment, a history screen 620 shown in FIG. 6C may be displayed when the history button 404 is pressed on the home screen 400. On the history screen 620, a competition history 621 of the execution player, and the like may be displayed. The competition history 621 may include information, such as a competition time (the relative time with respect to the current time), an opponent player, and a competition result. The competition result may include information indicating winning or losing, an opponent player, and first attack, revenge, or alternate revenge.

FIG. 6D is a diagram showing an example of an update information screen which may be displayed on the display unit 24.

An update information screen 630 shown in FIG. 6D may be displayed when the execution player logs in to the competition game and starts the competition game. The update information screen 630 may be displayed when the execution player is attacked by other players and information relating to the execution player is updated, or the like. On the update information screen 630, reward points 631, update information 632, and the like may be displayed.

The reward points 631 may be the total of the reward points which are not yet notified to the execution player. In a case where deduction points deducted by losing are greater than reward points given by winning when attacked by another player, the total of the displayed reward points may become a negative value. The update information 632 may be a competition result which is not yet notified to the execution player. The update information 632 may include information indicating a competition time (the relative time with respect to the current time), an opponent player, winning or losing, first attack, revenge, or alternate revenge, and indicating reward points for each competition.

The server 3 may determine whether or not each player displayed on the history screen 620 or the update information screen 630 is a player to be a target of revenge or alternate revenge, and in a case of a player to be a target of revenge or alternate revenge, may display an attack button for taking revenge or alternate revenge on the player. As described above, each player needs to repeat win and loss in the competition of the same player in order to increase the reward points. Accordingly, each player may be incentivized to attack and defeat the latest losing player with priority. For this reason, for example, on the history screen 620 or the update information screen 630 immediately after the execution player logs in, there is a high possibility that a player who has defeated the execution player immediately before the execution player logs out and has been defeated during logout may be displayed. Accordingly, in such a circumstance, the attack button may be displayed on the history screen 620 or the update information screen 630, whereby the execution player can easily specify a player who has defeated the execution player immediately before logout and has been defeated during logout, and can instantly attack the specified player.

Since each player is about to compete with the latest losing player with priority in order to defeat the latest losing player, on the history screen 620 or the update information screen 630, there is a high possibility that a player having a large number of repetitions of win and loss may be displayed. For this reason, the execution player may specify a player having a large number of repetitions of win and loss until now from the history screen 620 or the update information screen 630. Accordingly, the attack button may be displayed on the history screen 620 or the update information screen 630, whereby it is possible to allow the execution player to easily select a player capable of obtaining greater reward points by winning, and to improve player's convenience.

2.1.2. Configuration of Terminal Processing Unit 25

The terminal processing unit 25 may include at least a browsing execution unit 251. The browsing execution unit 251 may be a functional module which may be implemented with a program to be executed on a processor in the terminal processing unit 25. Alternatively, the browsing execution unit 251 may be mounted in the portable terminal 2 as firmware.

The browsing execution unit 251 may retrieve and display display data regarding the progress of the game. That is, the browsing execution unit 251 may transmit an acquisition request of display data regarding the progress of the game to the server 3 through the terminal communication unit 21 according to an instruction from the player. The browsing execution unit 251 may receive corresponding display data from the server 3 through the terminal communication unit 21. The browsing execution unit 251 may create drawing data based on received display data. That is, the browsing execution unit 251 may analyze received display data to specify control data and content data, layout similarly specified content data based on specified control data, and create drawing data. The browsing execution unit 251 may output created drawing data to the display unit 24. The browsing execution unit 251 may store respective information included in display data in the terminal storage unit 22 in a period during which communication connection with the server 3 is established.

2.2. Configuration of Server 3

Figure 7:
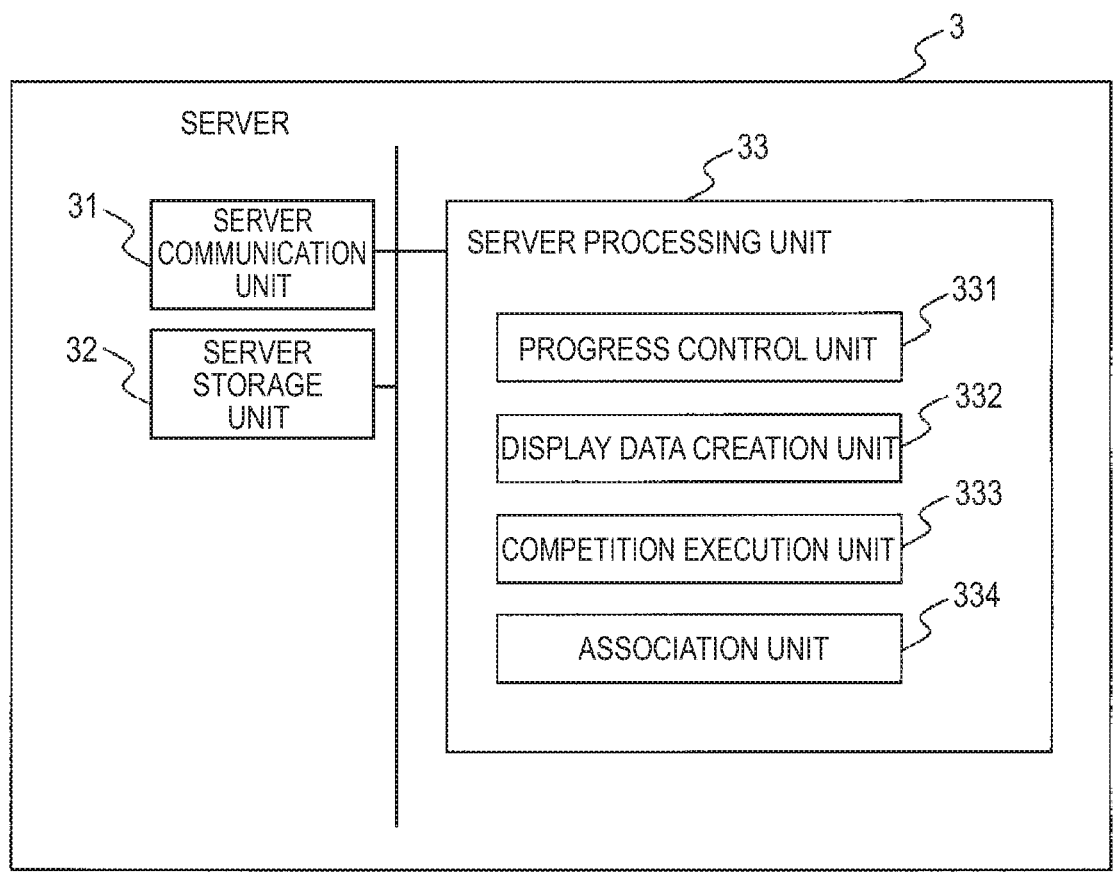
FIG. 7 is a diagram showing an example of the schematic configuration of a server.

FIG. 7 is a diagram showing an example of the schematic configuration of the server 3. FIGS. 8A to 8C are diagrams showing an example of the data structures of various tables which may be stored in a server storage unit 32.

The server 3 may include a server communication unit 31, a server storage unit 32, and a server processing unit 33. The server 3 may progress the game according to a request from the portable terminal 2. The server 3 may create display data regarding the progress of the game and may transmit display data to the portable terminal 2.

The server communication unit 31 may include a communication interface circuit which is an example of an output unit and may connect the server 3 to the Internet 7, and may perform communication with the Internet 7. The server communication unit 31 may supply data received from the portable terminal 2 or the like to the server processing unit 33. The server communication unit 31 may transmit data supplied from the server processing unit 33 to the portable terminal 2 or the like.

The server storage unit 32 may include, for example, at least one of a magnetic tape device, a magnetic disk device, or an optical disk device. The server storage unit 32 may store an operating system program, driver programs, application programs, data, and the like to be used for processing in the server processing unit 33. For example, the server storage unit 32 may store, as the application programs, a game program which progresses a game and creates display data regarding the result, and the like. The computer program may be installed on the terminal storage unit 22 from, for example, a computer-readable non-transitory recording medium, such as a CD-ROM or a DVD-ROM, using a known setup program or the like.

The server storage unit 32 may store, as data, a player table shown in FIG. 8A, a competition information table shown in FIG. 8B, a group table shown in FIG. 8C, and the like. The server storage unit 32 may temporarily store temporary data regarding predetermined processing.

FIG. 8A shows an example of a player table which manages the players. In the player table, for each player, information, such as an identification number (player ID) of the player, a password, a name, a file name of an avatar image, an owning item ID, usable item information, total points, and a group ID, is stored in association.

The owning item ID may be identification information of each item owned by the player. The usable item information may be an item ID, item attack power, and item defense power of an item (weapon) to be used by the player in a competition. The group ID may be identification information of a group to which the player belongs. The item attack power and the item defense power are examples of item parameters.

FIG. 8B shows a competition information table which manages information relating to a competition between the players. In the competition information table, for each combination of two competing players among a plurality of players who participate in a competition event, information, such as a player ID of each player, a competition result, a chain count, and a correction value of each player, is stored in association.

In the competition result, for each competition between two players, competition date and time, a player ID of an offensive player, whether the offensive player wins or loses, and the like may be shown. The chain count may be a chain count between two players. The correction value of each player may be given, for example, in a case where each player fails revenge on an opponent player (loses consecutively), and may be used to correct the attack power and/or the defense power of each player in a case where the next competition is performed between the two players.

FIG. 8C shows a group table which manages each group, into which each player is classified. In the group table, for each group, a group ID of the group, a player ID of a player who belongs to the group, and the like may be stored. In this way, in the player table and the group table, a player who belongs to a group, to which each player belongs, that is, a relevant player who is related to each player may be stored.

2.2.1. Configuration of Server Processing Unit 33

The server processing unit 33 may include a progress control unit 331, a display data creation unit 332, a competition execution unit 333, an association unit 334, and the like. These units may be functional modules which are implemented with a program to be executed on a processor the server processing unit 33. Alternatively, these units may be mounted in the server 3 as firmware.

The progress control unit 331 may control the start and progress of the game, and may appropriately instruct the display data creation unit 332, the competition execution unit 333, and the association unit 334 to execute processing. The progress control unit 331 may exchange required data with the portable terminal 2 through the server communication unit 31.

If a request of each screen described referring to FIGS. 4A to 6D is received from the portable terminal 2, the progress control unit 331 may create or instruct the respective units to create display data for displaying buttons for receiving an instruction from the player, text information to be notified to the player, images, and the like in a layout according to the screen, and may transmit display data to the portable terminal 2. If any button on the screen displayed on the portable terminal 2 is pressed and a request of the next screen corresponding to the button is received from the portable terminal 2, the progress control unit 331 may create or instruct the respective units to create display data the next screen similarly and transmit display data to the portable terminal 2.

In particular, in a case where the player performs an operation to start the game using the portable terminal 2 or an operation to transition to the home screen and a home screen request corresponding to the operation is received from the portable terminal 2, the progress control unit 331 may instruct the display data creation unit 332 to create display data for displaying the home screen 400. In a case where information relating to the player is updated due to an attack from another player, or the like after the competition is executed, the display data creation unit 332 may create display data for displaying the update information screen 630, in place of display data for displaying the home screen 400. The progress control unit 331 may transmit display data created by the display data creation unit 332 to the portable terminal 2.

In a case where the attack button 401, the state button 402, the record button 403, or the history button 404 is pressed on the home screen 400 displayed on the portable terminal 2, the progress control unit 331 may instruct the display data creation unit 332 to create display data for displaying the attack selection screen 410, the state screen 600, the record screen 610, or the history screen 620, respectively. The progress control unit 331 may transmit display data created by the display data creation unit 332 to the portable terminal 2.

Similarly, in a case where the first attack button 411 is pressed on the attack selection screen 410, and a first attack selection screen request corresponding to this operation is received, the progress control unit 331 may instruct the display data creation unit 332 to create display data for displaying the first attack selection screen 420. In a case where the revenge button 412 is pressed on the attack selection screen 410 and a revenge selection screen request corresponding to this operation is received, the progress control unit 331 may instruct the display data creation unit 332 to create display data for displaying the revenge selection screen 430. In a case where the alternate revenge button 413 is pressed on the attack selection screen 410 and an alternate revenge selection screen request corresponding to this operation is received, the progress control unit 331 may instruct the display data creation unit 332 to create display data for displaying the alternate revenge selection screen 500 or 510. The progress control unit 331 may transmit display data created by the display data creation unit 332 to the portable terminal 2.

In a case where the attack button 424 is pressed on the first attack selection screen 420, the revenge selection screen 430, or the alternate revenge selection screen 500 displayed on the portable terminal 2 and a competition request corresponding to this operation may be received from the portable terminal 2, the progress control unit 331 may instruct the competition execution unit 333 to execute a competition. The progress control unit 331 may transmit display data for displaying the result screen 520 or 530 created by the association unit 334 to the portable terminal 2. The competition request may include information indicating whether the competition is a first attack, revenge, or alternate revenge, and the player IDs of the execution player and the opponent player.

In a case where the creation of display data for displaying each screen is instructed from the progress control unit 331, the display data creation unit 332 may create display data for displaying the instructed screen and may transfer created display data to the progress control unit 331.

In particular, in a case where the creation of display data for displaying the first attack selection screen 420 is instructed from the progress control unit 331, the display data creation unit 332 may specify the player ID of the execution player included in the first attack selection screen request and may extract the total points corresponding to the player ID of the execution player from the player table. The display data creation unit 332 may specify, in the competition information table, a player ID of a player for whom a combination with the player ID of the execution player is not stored, and a player ID of a player for whom a combination with the player ID of the execution player is stored but who has not yet been defeated by the offensive player in this combination. The display data creation unit 332 may specify, from the player table, a predetermined number of player IDs among the specified player IDs in an order in which the corresponding total points are close to the extracted total points. The display data creation unit 332 may extract, from the player table, respective information, such as the player names, image data, and the total points corresponding to the specified player IDs, may create display data of the first attack selection screen based on the respective extracted information, and may transfer created display data to the progress control unit 331.

In a case where the creation of display data for displaying the revenge selection screen 430 is instructed from the progress control unit 331, the display data creation unit 332 may specify the player ID of the execution player included in the revenge selection screen request. The display data creation unit 332 may specify, from the player table, a group ID corresponding to the player ID of the execution player, and may extract, from the group table, the player ID of each relevant player corresponding to the specified group ID. The display data creation unit 332 may extract, from the competition information table, the combinations including the player ID of the execution player, and may specify the player ID of the opponent player included in the combinations, in which the execution player has been attacked and defeated by the opponent player and then the execution player or any relevant player has not attacked and defeated the opponent player, among the extracted combinations. Then, the display data creation unit 332 may extract, from the player table, respective information, such as the player name, image data, and the total points corresponding to the specified player ID of the opponent player, may create display data of the revenge selection screen based on the respective extracted information, and may transfer created display data to the progress control unit 331.

In a case where the creation of display data for displaying the alternate revenge selection screen 500 is instructed from the progress control unit 331, the display data creation unit 332 may specify the player ID of the execution player included in the alternate revenge selection screen request. The display data creation unit 332 may specify, from the player table, a group ID corresponding to the player ID of the execution player, and may extract, from the group table, the player ID of each relevant player corresponding to the specified group ID. The display data creation unit 332 may extract, from the competition information table, combinations including the extracted player ID of each relevant player, and may specify the player ID of the opponent player included in the combinations, in which each relevant player has been attacked and defeated by the opponent player and then the execution player or any relevant player has not attacked and defeated the opponent player, among the extracted combinations. The display data creation unit 332 may extract, from the player table, respective information, such as the player name, image data, and the total points corresponding to the specified player ID of the opponent player, may create display data of the alternate revenge selection screen based on the respective extracted information, and may transfer created display data to the progress control unit 331.

In a case where the execution of the competition is instructed from the progress control unit 331, the competition execution unit 333 may specify the player IDs of the execution player and the opponent player included in the competition request, and may extract, in the player table, item information (item attack power and item defense power) corresponding to the specified player IDs. The competition execution unit 333 may specify, in the competition information table, the chain count associated with the combination of the execution player and the opponent player and the correction value of each player. The competition execution unit 333 may calculate the parameter regarding the competition of each player based on the extracted item attack power and item defense power and may correct the calculated parameter based on the correction value of each specified player. The competition execution unit 333 may execute the competition between the two players based on the calculated parameter.

The competition execution unit 333 may calculate, as the parameter regarding the competition of the execution player, total attack power by adding a value obtained by multiplying the item attack power of the execution player by the correction value of the execution player to the item attack power. The competition execution unit 333 may calculate, as the parameter regarding the competition of the opponent player, total defense power by adding a value obtained by multiplying the defense power of the opponent player by the correction value of the opponent player to the item defense power. The correction value of each player may be, for example, a correction value determined in advance specific to an item of each player. The correction value specific to the item may be a predetermined value greater than 0 in a case where the item is a special item provided for a competition event, and may be 0 in a case of other items.

In a case where the offensive execution player has attacked and has been defeated by the opponent player in the past and then has not attacked and defeated the opponent player, a second predetermined value greater than 0 may be added to the correction value of the execution player. The second predetermined value may be added each time the execution player attacks and is defeated by the opponent player, and may be reset in a case where the execution player attacks and defeats the opponent player. The second predetermined value is an example of second points. In this way, the competition execution unit 333 gives the second predetermined value to the losing player by storing the second predetermined value in association with the losing player and corrects the parameter regarding the competition of the player based on the second predetermined value. With this, a possibility that the offensive player loses consecutively is reduced, successful revenge is easily made, and the competition game can be activated.

The second predetermined value may be given to any one of the players who participate in the competition. For example, in a case where the offensive execution player has attacked and has been defeated by the opponent player in the past and then has not attacked and defeated the opponent player, the second predetermined value smaller than 0 may be added to the correction value of the opponent player. In this case, the competition execution unit 333 stores the second predetermined value in association with the winning player and corrects the parameter regarding the competition of the player based on the second predetermined value. In this case, a possibility that the defensive player wins consecutively is reduced, successful revenge is easily made, and the competition game can be activated.

A random value which is calculated in a random manner may be added to or subtracted from the correction value of the offensive execution player and/or the defensive opponent player. With this, a possibility that one player continuously loses and does not continue the competition game is reduced, and the competition game can be activated.

The competition execution unit 333 may execute the competition between the execution player and the opponent player based on the calculated total attack power of the execution player and the total defense power of the opponent player. The competition execution unit 333 may determine that the execution player wins in a case where the total attack power of the execution player is equal to or greater than the total defense power of the opponent player, and may determine that the execution player loses in a case where the total attack power of the execution player is less than the total defense power of the opponent player.

The competition execution unit 333 may determine whether or not revenge or alternate revenge is successful. When the competition is revenge, the competition execution unit 333 may determine that revenge is successful in a case where the execution player wins and the execution player has been attacked and defeated by the opponent player in the past and then has not attacked and defeated the opponent player. The competition execution unit 333 may determine that revenge is not successful in a case where the execution player loses and the execution player has not been attacked and defeated by the opponent player or has been attacked and defeated by the opponent player in the past and then has attacked and defeated the opponent player.

The competition execution unit 333 may determine whether or not revenge is successful regardless of whether a winning or losing player is an offensive player or a defensive player. In this case, the competition execution unit 333 may determine that revenge is successful in a case where the player who wins the competition has been defeated by the losing player in the past and then has not defeated the losing player. The competition execution unit 333 may determine that revenge is not successful in a case where the player who wins the competition has not been defeated by the losing player in the past or has been defeated by the losing player in the past and then has defeated the losing player.

When the competition is alternate revenge, the competition execution unit 333 may determine that alternate revenge is successful in a case where the execution player wins and the alternated player has been attacked and defeated by the opponent player in the past and then the execution player or any relevant player has not attacked and defeated the opponent player. The competition execution unit 333 may determine that alternate revenge is not successful in a case where the execution player loses, a case where the alternated player has not been attacked and defeated by the opponent player in the past, or a case where the alternated player has been attacked and defeated by the opponent player in the past and then the execution player or any relevant player has attacked and defeated the opponent player.

The competition execution unit 333 may increase (for example, increments (+1)) the chain count regarding the combination of the execution player and the opponent player in a case where revenge is successful. The competition execution unit 333 may increase the chain count regarding the combination of the alternated player and the opponent player in a case where alternate revenge is successful. That is, when a relevant player related to a player who wins the competition is defeated by a losing player in an immediately preceding competition, the competition execution unit 333 may increase the chain count regarding the combination of the relevant player and the losing player.

The competition execution unit 333 may change the chain count regarding to the combination of two competing players in a case where a predetermined time has elapsed from an immediately preceding competition of the two competing players. For example, the competition execution unit 333 initializes the chain count to 0 in a case where the predetermined time has elapsed from the immediately preceding competition. Alternatively, in a case where the predetermined time has elapsed from the immediately preceding competition, the competition execution unit 333 may decrease the chain count regarding the combination of the two competing players according to the elapsed time from the immediately preceding competition. As described below, the reward points which are given to the player who wins the competition are determined by the chain count. For this reason, if the chain count is initialized or decreased, the reward points decrease. Accordingly, since each player is about to execute revenge in a shorter time such that the chain count is not initialized or decreased, a competition event can be activated.

The competition execution unit 333 may differ the predetermined time until the chain count is changed or an interval (a change rate to time) of changing the chain count according to the current chain count. For example, the competition execution unit 333 may make the predetermined time or the interval of changing the chain count shorter when the current chain count is larger. With this, it is possible to suppress a reduced desire that a beginner player with a small chain count might have to participate in a competition game due to a decrease in chain count, while more positively prompting each player to participate in the competition game. A beginner player may be a player who newly participates in the competition event, and may be, for example, a player with an elapsed time after the participation in the competition event within a predetermined time or a player who has a record or level in the competition event, such as a chain count, equal to or less than a predetermined value.

In this case, the display data creation unit 332 may display, on the revenge selection screen 430 shown in FIG. 4D and the alternate revenge selection screen 500 shown in FIG. 5A, an opponent player regarding a competition close to the time when the predetermined time elapses from the immediately preceding competition. For example, the display data creation unit 332 may display, on the revenge selection screen 430 and the alternate revenge selection screen 500, each opponent player in order of closeness of the time when the predetermined time elapses from the immediately preceding competition. By doing this, since it is possible to allow each player to select an opponent player regarding a competition, which is likely to initialize the chain count, with priority, it is possible to improve player's convenience.

An upper limit value may be set for the chain count. With this, it is possible to prevent a player who holds a plurality of accounts from making a competition between characters corresponding to the accounts held by the player to extremely increase the chain count, and to secure fairness between players. In a case where the upper limit value is set for the chain count, the competition execution unit 333 may change the upper limit value according to an elapsed time after the competition event starts. For example, the competition execution unit 333 may change the upper limit value such that the longer the elapsed time after the competition event starts, the greater the upper limit value. With this, each player takes into consideration the timing at which revenge is executed, and it is possible to improve strategy for increasing the chain count.

The association unit 334 may determine the reward points based on the chain count and gives the determined reward points to the winning player. The association unit 334 may store the reward points in association with the winning player and may give the reward points to the winning player by adding the reward points to the total points associated with the winning player in the player table. The association unit 334 may determine the deduction points based on the competition result and may deduct the determined deduction points from the losing player.

In a case where the competition is a first attack, the association unit 334 may determine a value determined in advance as the reward points. The association unit 334 may make the reward points in a case where the execution player who makes a first attack wins greater than the reward points in a case where the opponent player wins. With this, each player may positively attack other players, and the competition game can be activated. The association unit 334 may correct the reward points based on the total points already given to each competing player. For example, the association unit 334 may correct the reward points such that, the higher the total points of the losing player, the higher the reward points, and the higher the total points of the winning player, the lower the reward points. The reward points which are given in a case of defeating a strong player become great, whereby each player is about to attack a stronger player. For this reason, it is possible to prevent the offensive player from winning unilaterally, and to maintain the balance of win/loss.

In a case of deducting the deduction points from the losing player, similarly to the reward points, the association unit 334 may determine a value determined in advance as the deduction points. For example, the association unit 334 may determine the deduction points to a value smaller than the reward points. The deduction points which are deducted when a player loses the competition are set to a small value, whereby it is possible to suppress degradation of player's motivation to the competition. The association unit 334 may correct the deduction points in the same manner as the reward points. The association unit 334 may not deduct the deduction points from the execution player in a case where the execution player loses and may deduct the deduction points from the opponent player only in a case where the opponent player loses. With this, each player may positively attack other players without fearing to be defeated by other players, and the competition game can be activated.

In a case where the competition is revenge, the association unit 334 may determine the reward points and/or the deduction points in the same manner as in a case where the competition is a first attack. However, the association unit 334 may determine a value obtained by multiplying the value determined in advance by the chain count regarding the combination of the execution player and the opponent player as the reward points and/or the deduction points. The association unit 334 may determine the reward points and/or the deduction points such that the reward points and/or the deduction points in a case where the competition is revenge become smaller than the reward points and/or the deduction points in a case where the competition is a first attack. The association unit 334 may determine the reward points and/or the deduction points such that the reward points and/or the deduction points in a case where the competition is revenge become greater than the reward points and/or the deduction points in a case where the competition is a first attack.

The association unit 334 may change whether to make the reward points, and/or the deduction points, in a case where the competition is revenge, greater or smaller than the reward points and/or the deduction points in a case where the competition is a first attack, according to the number of players who participate in the competition game. For example, in a case where the number of players who participate in the competition game is equal to or greater than a predetermined number, the association unit 334 may make the reward points and/or the deduction points awarded in a case when the competition is revenge greater than the reward points and/or the deduction points awarded in a case where the competition is a first attack. In a case where the number of players who participate in the competition game is less than the predetermined number, the association unit 334 may instead make the reward points and/or the deduction points awarded in a case where the competition is revenge smaller than the reward points and/or the deduction points awarded in a case where the competition is a first attack.

In a case where the number of players who participate in the competition game is equal to or greater than the predetermined number, the association unit 334 may make the reward points and/or the deduction points awarded in a case where the competition is revenge smaller than the reward points and/or the deduction points awarded in a case where the competition is a first attack. In a case where the number of players who participate in the competition game is less than the predetermined number, the association unit 334 may make the reward points and/or the deduction points awarded in a case where the competition is revenge greater than the reward points and/or the deduction points awarded in a case where the competition is a first attack. With these, the association unit 334 can adjust whether each player executes the first attack or revenge with priority according to the number of players who participate in the competition game, and it is possible to appropriately set the game balance.

The association unit 334 may change whether to make the reward points and/or the deduction points awarded in a case where the competition is revenge greater or smaller than the reward points and/or the deduction points awarded in a case where the competition is a first attack according to an elapsed time after the competition event is held. For example, in a case where the elapsed time after the competition event is held is less than a predetermined time, the association unit 334 may make the reward points and/or deduction points awarded in a case where the competition is revenge smaller than the reward points and/or deduction points awarded in a case where the competition is a first attack. In a case where the elapsed time after the competition event is held is equal to or greater than the predetermined time, the association unit 334 may make the reward points and/or deduction points awarded in a case where the competition is revenge greater than the reward points and/or deduction points awarded in a case where the competition is a first attack. With this, the association unit 334 can perform control such that the first attack may be more frequently performed in the early stage of the competition event to perform shallow and wide exchanges (communications) among the players, and such that revenge may be more frequently performed in the later stage of the competition event to deepen exchanges among specific players to be a target of revenge. Since the type of relation among the players changes over time, communications among the players can be activated.

In a case where the competition is alternate revenge, the association unit 334 may determine the reward points and/or the deduction points in the same manner as in a case where the competition is revenge. However, the association unit 334 may determine a value obtained by multiplying a value determined in advance by the chain count regarding the combination of the alternated player and the opponent player as the reward points and/or the deduction points. The association unit 334 may determine the reward points and/or the deduction points such that the reward points and/or the deduction points in a case where the competition is alternate revenge become smaller than the reward points and/or deduction points in a case where the competition is revenge. Alternatively, the association unit 334 may determine the reward points and/or the deduction points such that the reward points and/or the deduction points awarded in a case where the competition is alternate revenge become greater than the reward points and/or deduction points awarded in a case where the competition is revenge.

The association unit 334 may determine a value obtained by multiplying a different value determined in advance by the chain count as second reward points and may give the determined second reward points to the alternated player. For example, in an exemplary embodiment, the association unit 334 may set the second reward points given to the alternated player to the same value as the reward points given in a case where the alternated player takes revenge successfully, and may set the reward points given to the alternate player to a value (for example, a value smaller than the second reward points) different from the second reward points. The reward points given to the alternate player and the second reward points given to the alternated player may be adjusted to different values, whereby it is possible to encourage a player not to frequently perform only one of revenge and alternate revenge, and to appropriately adjust the game balance. The reward points given to the alternate player may be set to a value smaller than the second reward points given to the alternated player, whereby the alternated player further appreciates the alternate player, and communications among the players can be activated.

In a case where the competition is alternate revenge and the losing opponent player is also a player to be a target of revenge of the execution player, the competition execution unit 333 may determine that both of revenge and alternate revenge are successful simultaneously. In this case, the competition execution unit 333 may increase the chain count regarding the combination of the execution player and the opponent player and the chain count regarding the combination of the alternated player and the opponent player. The association unit 334 gives the reward points to the execution player and the alternated player, respectively. With this, the execution player can attain both of revenge and alternate revenge simultaneously, and it is possible to improve a game property.

In this case, the association unit 334 may differ the ratio of the reward points given to the execution player to the reward points given to the alternated player. For example, the association unit 334 may set the reward points given to the execution player to a value greater than the reward points given to the alternated player. With this, the execution player may select a player capable of simultaneously attaining alternate revenge when performing revenge as an opponent player, and alternate revenge can be activated. The association unit 334 may determine the ratio of the reward points given to the execution player to the reward points given to the alternated player according to a request from the execution player. With this, the execution player can determine whether to make the reward points given to the execution player greater when revenge is successful or the reward points given to the alternated player greater, and it is possible to improve strategy in the competition game.

In a case where a parameter, such as stamina, is stored for each player and a predetermined cost value is consumed from the stamina of each player each time each player makes a competition, the association unit 334 may make the cost value consumed in a case where the competition is alternate revenge greater than the cost value consumed in a case where the competition is a first attack or revenge. Even with this, the alternated player further appreciates the alternate player, and communications among the players can be activated.

The association unit 334 may correct the reward points based on an elapsed time after the winning player has been defeated by the losing player in the immediately preceding competition. For example, the association unit 334 corrects the reward points such that the shorter the elapsed time, the greater the reward points, and the longer the elapsed time, the smaller the reward points. With this, since each player is about to execute revenge in a shorter time in a case where each player is defeated by another player, the competition event can be activated.

The association unit 334 may correct the reward points based on the number of combinations regarding the winning player in which the chain count is equal to or greater than a predetermined value. The association unit 334 may correct the reward points such that the greater the number of combinations in which the chain count is equal to or greater than the predetermined value, the greater the reward points, and the smaller the number of combinations, the smaller the reward points. With this, since each player is incentivized to execute revenge on as many players as possible, the competition event can be activated.

The association unit 334 may augment the item used by each player in the competition according to the reward points given to each player. The association unit 334 determines the item attack power and the item defense power of the item used by the player according to the total points of the player given the reward points such that the higher the total points, the higher the attack power and the defense power. The association unit 334 may augment each item by updating, in the player table, the item attack power and the item defense power associated with each player to the determined item attack power and item defense power. In this way, the parameter regarding the competition of each player may be calculated based on the reward points given to each player.

In a case where the item used by each player in the competition is excessively augmented and has not been defeated by other players, revenge from other players may not be executed, and as a result, there is a possibility that each player cannot execute revenge on other players. Accordingly, in a case where the item attack power and/or the item defense power of the item used by each player in the competition becomes equal to or greater than a predetermined value, the association unit 334 may provide each player with means for reducing the item attack power and/or the item defense power. For example, the association unit 334 may store, as an owning item ID, an item ID of an item for reducing the item attack power and/or the item defense power in association with each player in the player table, thereby providing the item to each player. Means for reducing the item attack power and/or the item defense power may not be limited to an item, and may be, for example, execution of a predetermined event, a competition with a predetermined opponent, or the like.

In a case where predetermined conditions are satisfied, the association unit 334 may give the item used by each player in the competition to each player such that each player can use the item in other events. For example, the server 3 may execute a competition event only for a predetermined period, and the association unit 334 may give an item to each player on a condition that the execution period of the competition event has elapsed. The association unit 334 may generate an item ID of an item corresponding to usable item information associated with each player in the player table and stores the item ID as an owning item ID, thereby giving an item to each player. In the player table, usability conditions (for example, a usability event, a usability period, and a usability area) of each item or the like may be set in association with each item ID. In this case, the association unit 334 may set the usability conditions of each item to be different, based on a condition that the execution period of the competition event has elapsed. Since each player can use an item given as a reward of the competition event for other events, each player may participate more positively in the competition event in order to augment the item, and the competition event can be activated.

The association unit 334 may create display data for displaying the result screen 520 or 530 according to the competition result and transfers created display data to the progress control unit 331.

In a case where the execution player wins, the association unit 334 may create display data for displaying the result screen 520 on which the effect of winning the competition, the reward points given by the competition, the chain count, information relating to the execution player and the opponent player, and the like are provided. In a case where the execution player loses, the association unit 334 may create display data for displaying the result screen 530 on which the effect of losing the competition, the deduction points deducted by competition, the correction value in the next competition, information relating to the execution player and the opponent player, and the like are provided. The correction value in the next competition may be displayed on the result screen 530, whereby the execution player recognizes improvement of a possibility that the execution player can defeat the opponent player in the next competition and is about to compete with the opponent player. For this reason, the competition event can be activated.

FIG. 9 is a diagram showing an example of an operation sequence regarding game processing of the game system 1. This operation sequence may be executed based on the programs stored in advance in the terminal storage unit 22 and the server storage unit 32 primarily by the terminal processing unit 25 and the server processing unit 33 in cooperation with the respective components of the portable terminal 2 and the server 3.

According to an exemplary embodiment of an operation sequence, first, in a state where the attack selection screen 410 is displayed on the display unit 24 of the portable terminal 2, if the player presses the first attack button 411, the revenge button 412, or the alternate revenge button 413 using the operating unit 23, the browsing execution unit 251 of the portable terminal 2 may transmit the corresponding selection screen request to the server 3 through the terminal communication unit 21 (Step S101). In a case where the progress control unit 331 of the server 3 receives the selection screen request from the portable terminal 2, the display data creation unit 332 may create display data of the corresponding selection screen 420, 430, or 500 (Step S102). Next, the progress control unit 331 may transmit created display data to the portable terminal 2 (Step S103). In a case where display data is received from the server 3 through the terminal communication unit 21, the browsing execution unit 251 of the portable terminal 2 creates drawing data based on received display data and displays the corresponding selection screen 420, 430, or 500 on the display unit 24 (Step S104).

Next, in a state where the selection screen 420, 430, or 500 is displayed on the display unit 24 of the portable terminal 2, if the player presses the attack button 424 using the operating unit 23, the browsing execution unit 251 of the portable terminal 2 may transmit the corresponding competition request to the server 3 through the terminal communication unit 21 (Step S105). In a case where the progress control unit 331 of the server 3 receives the competition request from the portable terminal 2, the competition execution unit 333 and the association unit 334 may execute competition processing (Step S106). The details of the competition processing will be described below. Next, the association unit 334 may create display data for displaying the result screen 520 or 530 according to the competition result (Step S107). Next, the competition execution unit 333 may transmit created display data to the portable terminal 2 (Step S108). In a case where display data is received from the server 3 through the terminal communication unit 21, the browsing execution unit 251 of the portable terminal 2 may create drawing data based on received display data and may display the result screen 520 or 530 on the display unit 24 (Step S109). With the above, the operation sequence regarding the game processing ends.

Figure 10:
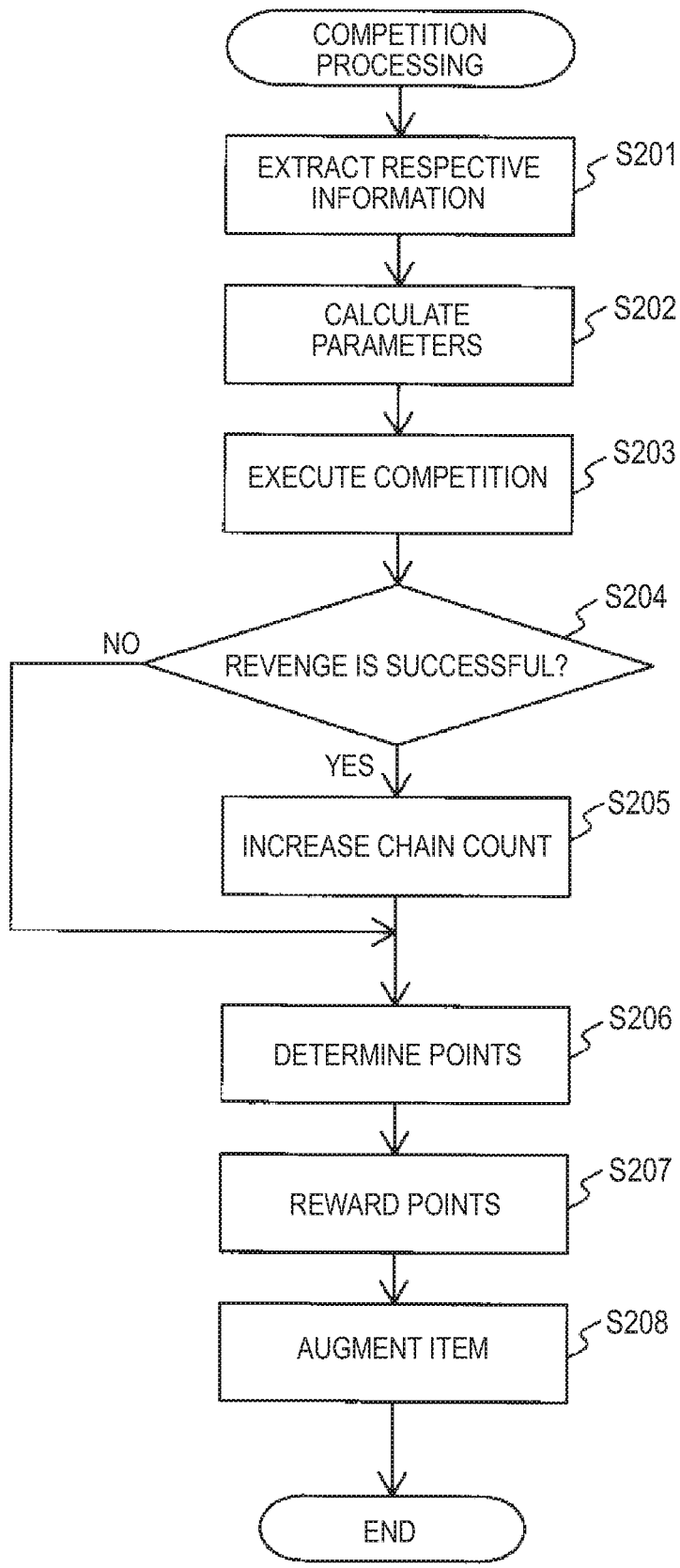
FIG. 10 is a diagram showing an example of an operation flow of competition processing.

FIG. 10 shows an operation flow of the competition processing in the competition execution unit 333 and the association unit 334. The competition processing shown in FIG. 10 may be executed in Step S106 of FIG. 9.

In an exemplary embodiment, the competition execution unit 333 may first specify the player IDs of the execution player and the opponent player included in the competition request and may extract respective information corresponding to the specified player IDs in the player table. The competition execution unit 333 may specify the chain count associated with the combination of the execution player and the opponent player and the correction value of each player in the competition information table (Step S201).

Next, the competition execution unit 333 may calculate the parameter regarding the competition of each player based on the respective extracted information and may correct the calculated parameter based on the correction value of each player (Step S202).

Next, the competition execution unit 333 may execute the competition between the two players based on the calculated parameters (Step S203).

Next, the competition execution unit 333 may determine whether or not revenge or alternate revenge is successful (Step S204).

In a case where revenge or alternate revenge is not successful, the competition execution unit 333 may progress the process to Step S206. In a case where revenge of alternate revenge is successful, the chain count regarding the corresponding combination of the two players may be increased (Step S205).

Next, the association unit 334 may determine the reward points based on the chain count (Step S206).

Next, the association unit 334 may give the determined reward points to the winning player (Step S207).

Next, the association unit 334 may augment the item used by each player in the competition based on the reward points given to each player (Step S208), and a sequence of steps ends.

As described above, the server 3 may change the reward points given to the winning player according to the chain count in the competition game in which the players compete with each other. With this, it is possible to improve a strategy for obtaining points in the competition game, and to maintain and improve players' desires to execute the game.

Other exemplary embodiments may also be understood. For example, each function of the server processing unit 33 described above may be executed in the terminal processing unit 25 of the portable terminal 2. In this case, if the player table, the competition information table, and the group table are stored in the terminal storage unit 22, it is not necessary to perform communication with the server 3 for respective processing, and the above-described functions may be implemented only with the portable terminal 2. For example, a game which is executed on the portable terminal 2 may be a hybrid game in which each of the server 3 and the portable terminal 2 takes charge of a part of processing. In this case, for example, a Web display may be performed to display each screen regarding the progress of the game on the portable terminal 2 based on display data generated by the server 3, and a native display may be performed to display the screen used for the competition or the like with a native application installed on the portable terminal 2.

A competition which is executed by the server 3 may be executed between at least two players or may be executed among three or more players. In this case, in the competition information table, a competition result and a chain count may be stored for each combination of three or more players. The competition execution unit 333 may execute a competition among three or more players and determines whether each player wins or loses. In a case where a winning player has been defeated by a losing player in an immediately preceding competition, the competition execution unit 333 may determine that revenge is successful and may increase the chain count relating to the combination of the competing players. The association unit 334 may determine reward points based on the chain count and may give the determined reward points to each winning player.

In a case where all players win alternately, the competition execution unit 333 may determine that revenge is successful and may increase the chain count. For example, in a case where three players A, B, and C participate in the competition game, the competition execution unit 333 may determine revenge is successful on a condition that the player A wins, the player B wins next, and the player C wins next, and may increase the chain count regarding the combination of the three players A, B, and C. Alternatively, the competition execution unit 333 may determine that revenge is successful on a condition that a specific player and a player other than the player win alternately, and may increase the chain count. For example, in a case where the three players A, B, and C participate in the competition game, it may be determined that revenge is successful on a condition that the player A wins and the player B or C wins next, and the chain count regarding the combination of the three players A, B, and C may be increased.

The server 3 may manage combinations of two players and combinations of three or more players simultaneously. For example, in a case where the three players of the player A, the player B, and the player C participate in the competition game, the server 3 may manage combinations of the two players of the players A and B, the players B and C, and the players C and A, and a combination of the three players of the players A, B, and C simultaneously. In this case, when revenge of the player A on the player B is successful, the competition execution unit 333 may increase the chain count regarding the combination of the two players A and B and the chain count regarding the combination of the three players A, B, and C. Even with these, it is possible to improve strategy for obtaining the points in the competition game, and to maintain and improve players' desires to execute the game.

It should be understood by those skilled in the art that various changes, substitutions, and modifications may be added to the invention without departing from the spirit and scope of the invention.

What is claimed is:

1. A non-transitory computer-readable storage medium comprising program code that, when executed, causes a computer including a storage unit and an output unit to provide a plurality of graphical user interfaces and automatically update the graphical user interfaces based on operations of a competition game,
wherein the storage unit is configured to store a competition result and a counter for each combination of at least two competing players,
wherein before a step of executing a competition, the computer is configured to execute the step of outputting, to the output unit, display data for displaying, on a terminal of each player, a graphical user interface for each player comprising an initial player-specific game screen, the initial player-specific game screen comprising an interface element for executing the competition against competing players, wherein the graphical user interface comprises:
a revenge selection screen configured to display, for each player, a limited list of competing players available to said player as competition targets, the limited list comprising at least one player who has defeated said player in an immediately preceding competition, the display indicating the at least one player to be a valid target for competition, the revenge selection screen restricting a player who has been defeated by each player in the immediately preceding competition from being displayed as a valid target for competition, and
a competition execution screen, the competition execution screen configured to be launched based on the selection of the interface element for executing the competition against competing players, wherein the computer is configured to update a competition execution screen based on a result of the competition between at least two players, the at least two players comprising a winning player and a losing player;
wherein the computer is configured to determine when the winning player of the at least two competing players was defeated by the losing player in the immediately preceding competition between the winning player and the losing player, and, when the winning player of the at least two competing players was defeated by the losing player in the immediately preceding competition between the winning player and the losing player, the computer is configured to increase the counter corresponding to the combination of the at least two competing players, display the increased counter on the revenge selection screen, add a second interface element to a revenge selection screen of the losing player for executing the competition against the winning player, and remove a third interface element to a revenge selection screen of the winning player for executing the competition against the losing player;
wherein the computer is configured to determine a quantity of points to be awarded to the winning player based on the counter corresponding to the combination of the at least two competing players, and wherein the computer is configured to store the determined points in the storage unit in association with the winning player; and
wherein the counter corresponding to the combination of the at least two competing players is configured to be initialized when a predetermined amount of time has elapsed from the immediately preceding competition of the at least two competing players.

2. The non-transitory computer-readable medium according to claim 1,
wherein, during the step of executing the competition, a competition parameter for each player is calculated based on the points given to each player.

3. The non-transitory computer-readable medium according to claim 2,
wherein a second set of points are stored in the storage unit in association with either the winning player or the losing player of the at least two competing players, and
in the step of executing the competition, the competition parameter for each player is corrected based on the second points associated with each player.

4. The non-transitory computer-readable medium according to claim 2,
wherein the competition parameter of each player is calculated based on a parameter of a game medium used by each player in the competition,
wherein one or more usability conditions are set in the game medium, and
wherein the usability conditions are configured to be adjusted based on one or more predetermined conditions, such that when the predetermined conditions are satisfied, the usability conditions of the game medium are adjusted.

5. The non-transitory computer-readable medium according to claim 2,
wherein the operations of the competition game further comprise determining when the competition parameter of each player becomes equal to or greater than a predetermined value, and, when the competition parameter of a player has become equal to or greater than the predetermined value, providing a means for reducing the parameter to each of the other players, and automatically updating the graphical user interfaces of each of the other players based on a step of providing the means for reducing the parameter.

6. The non-transitory computer-readable medium according to claim 1,
wherein the storage unit further stores, for each player, a relevant player associated with the player, and
wherein the computer is configured to determine if a relevant player associated with the winning player of the at least two competing players was defeated by the losing player in an immediately preceding competition between the relevant player associated with the winning player and the losing player, and, when the relevant player associated with the winning player was defeated by the losing player in an immediately preceding competition between the relevant player associated with the winning player and the losing player, the computer is configured to increase the counter corresponding to the combination of the relevant player associated with the winning player and the losing player, display the increased counter on the revenge selection screen, and update the revenge selection screen of each of the losing player, the winning player, and the relevant player associated with the winning player.

7. The non-transitory computer-readable medium according to claim 1,
wherein, in a step of determining the quantity of points to be awarded, the quantity of points to be awarded is adjusted based on an elapsed time between the immediately preceding competition between the winning player and the losing player, and the competition, or based on the number of combinations between the winning player and another player where the counter is equal to or greater than a predetermined value.

8. The non-transitory computer-readable medium according to claim 1, wherein the revenge selection screen further provides a competition button that, when selected, configures the system to navigate directly to a competition execution function.

9. The non-transitory computer-readable medium according to claim 1, wherein a step of determining when the winning player of the at least two competing players was defeated by the losing player in an immediately preceding competition between the winning player and the losing player further comprises:

when the winning player of the at least two competing players was not defeated by the losing player in the immediately preceding competition between the winning player and the losing player, preventing increase in the counter corresponding to the combination of the at least two competing players.

10. A control method which is configured to be executed by a computer which includes a storage unit and an output unit and which is configured to provide a plurality of graphical user interfaces and automatically update the graphical user interfaces based on operations of a competition game, wherein the storage unit is configured to store a competition result and a counter for each combination of at least two competing players, wherein the counter corresponding to the combination of the at least two competing players is configured to be initialized when a predetermined amount of time has elapsed from an immediately preceding competition of the at least two competing players; and wherein before executing a competition, the output unit is configured to display data on a terminal of each player, the display data comprising a graphical user interface for each player comprising an initial player-specific game screen, the initial player-specific game screen comprising an interface element for executing the competition against competing players, wherein the graphical user interface comprises:

a revenge selection screen configured to display, for each player, a limited list of competing players available to said player as competition targets, the limited list comprising at least one player who has defeated said player in the immediately preceding competition, the display indicating the at least one player to be a valid target for competition, the revenge selection screen restricting a player who has been defeated by each player in the immediately preceding competition from being displayed as a valid target for competition, and the control method comprises:

displaying a competition execution screen, the competition execution screen configured to be launched based on the selection of the interface element for executing the competition against competing players, executing the competition between at least two players, the at least two players comprising a winning player and a losing player, and updating the competition execution screen based on a result of the competition between the at least two players;

determining if the winning player of the at least two competing players was defeated by the losing player in the immediately preceding competition between the winning player and the losing player, and, when the winning player of the at least two competing players was defeated by the losing player in the immediately preceding competition between the winning player and the losing player, increasing the counter corresponding to the combination of the at least two competing players, displaying the increased counter on the revenge selection screen, adding a second interface element to a revenge selection screen of the losing player for executing the competition against the winning player, and removing a third interface element to a revenue selection screen of the winning player for executing the competition against the losing player; and determining a quantity of points to be awarded to the winning player based on the counter corresponding to the combination of the at least two competing players, and storing the determined points in the storage unit in association with the winning player.

11. A computer which is configured to execute a competition game and provide a plurality of graphical user interfaces, the computer being configured to automatically update the graphical user interfaces based on operations of the competition game, the computer comprising:

a storage unit configured to store a competition result and a counter for each combination of at least two competing players, wherein the counter corresponding to the combination of the at least two competing players is configured to be initialized when a predetermined amount of time has elapsed from an immediately preceding competition of the at least two competing players;

an output unit configured to display data on a terminal of each player before executing a competition, a graphical user interface for each player comprising an initial player-specific game screen, the initial player-specific game screen comprising an interface element for executing the competition against competing players, wherein the graphical user interface comprises:

a revenge selection screen configured to display, for each player, a limited list of competing players available to said player as competition targets, the limited list comprising at least one player who has defeated said player in the immediately preceding competition, the display indicating the at least one player to be a valid target for competition, the revenge selection screen restricting a player who has been defeated by each player in the immediately preceding competition from being displayed as a valid target for competition; and a competition execution screen, the competition execution screen configured to be launched based on the selection of the interface element for executing the competition against competing players, wherein the computer is configured to update a competition execution screen based on a result of executing, by a competition execution unit, the competition between at least two competing players, the at least two competing players comprising a winning player and a losing player;

the competition execution unit further being configured to determine if the winning player of the at least two competing players was defeated by the losing player in the immediately preceding competition between the winning player and the losing player, and, when the winning player of the at least two competing players was defeated by the losing player in the immediately preceding competition between the winning player and the losing player, the competition execution unit being configured to increase the counter corresponding to the combination of the at least two competing players, display the increased counter on the revenge selection screen, add a second interface element to a revenge selection screen of the losing player for executing the competition against the winning player, and remove a third interface element to a revenge selection screen of the winning player for executing the competition against the losing player; and the computer further comprising an association unit configured to determine a quantity of points to be awarded to the winning player based on the counter, and configured to store the determined points in the storage unit in association with the winning player.

\* \* \* \* \*